(12) United States Patent
Ding et al.

(10) Patent No.: US 10,656,441 B2
(45) Date of Patent: May 19, 2020

(54) OPTICAL MODULATOR HAVING A PLURALITY OF MODULATOR SEGMENTS

(71) Applicant: Elenion Technologies, LLC, New York, NY (US)

(72) Inventors: Ran Ding, New York, NY (US); Thomas Wetteland Baehr-Jones, Arcadia, CA (US); Peter D. Magill, Freehold, NJ (US); Michael J. Hochberg, New York, NY (US); Alexander Rylyakov, Staten Island, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 16/569,893

(22) Filed: Sep. 13, 2019

(65) Prior Publication Data

US 2020/0004055 A1   Jan. 2, 2020

Related U.S. Application Data

(63) Continuation of application No. 15/864,188, filed on Jan. 8, 2018, now Pat. No. 10,451,903, which is a continuation of application No. 15/347,202, filed on Nov. 9, 2016, now Pat. No. 9,874,767, which is a continuation of application No. 14/879,149, filed on Oct. 9, 2015, now Pat. No. 9,519,162.

(60) Provisional application No. 62/062,127, filed on Oct. 9, 2014.

(51) Int. Cl.
*G02F 1/035* (2006.01)
*G02F 1/01* (2006.01)
*G02F 1/225* (2006.01)
*G02F 1/025* (2006.01)

(52) U.S. Cl.
CPC ............ *G02F 1/0121* (2013.01); *G02F 1/011* (2013.01); *G02F 1/025* (2013.01); *G02F 1/035* (2013.01); *G02F 1/225* (2013.01)

(58) Field of Classification Search
CPC ........ G02F 1/0121; G02F 1/011; G02F 1/225; G02F 1/035; G02F 1/025
See application file for complete search history.

(56) References Cited

U.S. PATENT DOCUMENTS

| | | | |
|---|---|---|---|
| 7,046,093 B1 * | 5/2006 | McDonagh | H03L 7/10 327/156 |
| 2008/0089634 A1 * | 4/2008 | Mosinskis | G02F 1/0121 385/3 |
| 2011/0044573 A1 * | 2/2011 | Webster | G02F 1/0121 385/3 |
| 2013/0272700 A1 * | 10/2013 | Satoh | H04B 10/50 398/45 |

* cited by examiner

*Primary Examiner* — Ellen E Kim
(74) *Attorney, Agent, or Firm* — Stratford Managers Corporation

(57) ABSTRACT

An optical modulator apparatus may include a plurality of segment drivers, each segment driver having a unique offset voltage and driving but a portion or a segment of an electro-optical modulator. A modulating electrical signal may be applied to the segment drivers via a plurality of electrical delays. Parameters of the segment drivers may be selected so as to approximate a pre-defined transfer function, which may include a linear or a non-linear transfer function.

17 Claims, 21 Drawing Sheets

OPTICAL MODULATOR HAVING A PLURALITY OF MODULATOR SEGMENTS

CROSS-REFERENCE TO RELATED APPLICATIONS

This application is a continuation of U.S. patent application Ser. No. 15/864,188, filed Jan. 8, 2018, now allowed, which is a continuation of U.S. patent application Ser. No. 15/347,202, filed Nov. 9, 2016, now U.S. Pat. No. 9,874,767, which is a continuation of U.S. patent application Ser. No. 14/879,149, filed Oct. 9, 2015, now U.S. Pat. No. 9,519,162, which claims the benefit of U.S. Provisional Application No. 62/062,127, filed Oct. 9, 2014, each of which is hereby incorporated by reference herein in its entirety.

TECHNICAL FIELD

This disclosure relates to devices for modulating light and particularly to optical modulators including electrical amplifier circuitry.

BACKGROUND

An optical modulator is a device for modulating an optical signal, such as an optical carrier wave, by an electrical signal. Some property of the optical carrier wave, such as phase, amplitude, polarization, etc., may be modulated by the electrical signal by using an electro-optical effect of some kind, such as Pockels effect, electro-absorption effect, photoelasticity, etc. The electrical signal may need to be amplified to provide a degree of modulation of the optical carrier wave adequate for a particular application. Linear amplifiers are commonly used to provide amplification of an electrical signal for optical modulation, because linear amplifiers preserve the waveform of the electrical signal being amplified.

Referring to FIG. 1, a conventional modulator apparatus 100 includes a linear amplifier 102 connected to an optical modulator 104. In operation, a high-frequency electrical signal 106 creates a running electromagnetic wave 108, which propagates in a RF waveguide formed by electrodes 110 running parallel to an electro-optical waveguide 112. The electromagnetic wave 108 runs toward an RF termination 114. The electromagnetic wave 108 propagates in the electro-optical waveguide 112 at the same speed as light 114. As a result, the light 114 becomes effectively modulated.

The linear amplifier 102 provides a constant gain, which is independent on the input signal: $V_{out} = GV_{in}$, where $V_{in}$ is the input voltage, $V_{out}$ is the output voltage, and G is a constant. Referring to FIG. 2, the output voltage of the linear amplifier 102 is plotted against the input voltage. In this example, the input voltage range is −0.5V to 0.5V, and the corresponding output voltage range is −1V to 1V, so that the gain G=2.

Referring back to FIG. 1, the linear amplifier 102 is typically constructed to provide a significant amount of RF power for generation of the running electromagnetic wave 108. To drive the electrodes 110 in a linear fashion at high speed, a typical linear driver amplifier may consume twenty times more power than electrical power delivered to the optical modulator 104. This factor of power consumption is referred to as "overhead." Often, conventional linear modulators have a significant overhead.

Furthermore, to provide linear output, the electrical signal swing may need to be wider than typical output modulation range, to ensure that the output will be sufficiently close to linear in an operational range of interest. The requirement of linearity may sacrifice other performance metrics, such as amplifier power consumption or operating speed.

SUMMARY

According to one aspect of the disclosure, an optical modulator apparatus may include a plurality of drivers, each driver driving but a physical portion or segment of an electro-optical modulator. A modulating electrical signal may be applied to the segment drivers via a plurality of electrical delays, or via a single delay with a plurality of taps. The segment drivers may also be individually controlled by an external comparator module. Parameters of the segment drivers may be selected or programmed so as to approximate a pre-defined overall transfer function, for example a linear transfer function, or a non-linear transfer function if required.

In accordance with an aspect of the disclosure, there is provided an optical modulator comprising: an optical path comprising an optical input port for receiving an optical carrier wave, an optical output port for outputting a modulated optical signal, and a succession of serially optically coupled optical modulator segments extending between the input and output optical ports for modulating the optical carrier wave so as to obtain the modulated optical signal; a plurality of segment drivers, wherein each segment driver has associated: a low voltage $V_{low}$, a high voltage $V_{high}$, a unique offset voltage $V_{os}$, and a threshold voltage $V_{th}$, wherein each segment driver is electrically coupled to one of the succession of the modulator segments for applying a driving voltage $V_d$ thereto in response to a control voltage $V_c$, such that $V_d = V_{low}$ when $V_c < V_{os} - V_{th}$;

$V_d = V_{high}$ when $V_c > V_{os} + V_{th}$; and $V_d$ varies between $V_{low}$ and $V_{high}$ when $V_c$ varies between $V_{os} - V_{th}$ and $V_{os} + V_{th}$; an electrical input port for receiving an electrical signal to be modulated onto the optical carrier wave to obtain the modulated optical signal; and a plurality of electrical connections between the electrical input port and each segment driver.

In one exemplary embodiment, each segment driver may be implemented as a limiting amplifier having the corresponding low voltage $V_{low}$, the high voltage $V_{high}$, the unique offset voltage $V_{os}$, and the threshold voltage $V_{th}$. Each electrical connection may have a corresponding delay $\Delta T_{electrical}$ between the electrical input port and each limiting amplifier. The delays $\Delta T_{electrical}$ may be selected so that in operation, the application of the driving voltage $V_d$ to individual optical modulator segments in the succession of optical modulator segments is substantially synchronized with propagation of the optical carrier wave therein.

In another embodiment, the succession of serially optically coupled optical modulator segments includes an optical waveguide and a succession of electrodes disposed along the optical waveguide and operationally coupled to the optical waveguide. The plurality of electrical connections may include a succession of serially electrically coupled electrical delay line segments, such as a delay line with a plurality of taps. Each progressive one of the succession of electrical delay line segments or taps may be electrically coupled to a particular segment driver of the plurality of segment drivers, which is is electrically coupled to a corresponding progressive one of the succession of optical modulator segments. The offset voltage $V_{os}$ of each successive segment driver is preferably greater than the offset voltage $V_{os}$ of the immediately preceding segment driver, if any.

In accordance with the disclosure, there is further provided a method of modulating an optical carrier wave by an electrical signal, the method comprising: propagating the optical carrier wave in a succession of serially optically coupled optical modulator segments; and coupling the electrical signal a plurality of segment drivers, wherein each segment driver has associated: a low voltage $V_{low}$; a high voltage $V_{high}$; a unique offset voltage $V_{os}$; and a threshold voltage $V_{th}$, wherein each segment driver is electrically coupled to one of the succession of the modulator segments for applying a driving voltage $V_d$ thereto in response to a control voltage $V_c$, such that $V_d = V_{low}$ when $V_c < V_{os} - V_{th}$;

$V_d = V_{high}$ when $V_c > V_{os} + V_{th}$; and $V_d$ varies between $V_{low}$ and $V_{high}$ when $V_c$ varies between $V_{os} - V_{th}$ and $V_{os} + V_{th}$. The electrical signal may be coupled to an electrical input port, from which the electrical signal propagates to each segment driver via a plurality of electrical connections between an electrical input port and each segment driver. Each electrical connection may be configured to have a corresponding delay $\Delta T_{electrical}$ between the electrical input port and each segment driver. The delays $\Delta T_{electrical}$ may be selected so that the application of the driving voltage $V_d$ to individual optical modulator segments in the succession of optical modulator segments is substantially synchronized with propagation of the optical carrier wave therein. The offset voltage $V_{os}$ of each successive segment driver may be pre-selected to be greater than the offset voltage $V_{os}$ of the immediately preceding segment driver. Furthermore, in one embodiment, the low voltage $V_{low}$, the high voltage $V_{high}$, the offset voltage $V_{os}$, and the threshold voltage $V_{th}$ of each segment driver are pre-selected such that $V_{low}$ of each successive segment driver is substantially equal to $V_{high}$ of the immediately preceding segment driver, if any.

In accordance with the disclosure, there is further provided a modulator apparatus comprising: an optical path comprising an optical input port for receiving an optical carrier wave, an optical output port for outputting a modulated optical signal, and N serially optically coupled optical modulator segments extending between the input and output optical ports for modulating the optical carrier wave so as to obtain the modulated optical signal, wherein N is an integer; an electrical input port for receiving an electrical signal to be modulated onto the optical carrier wave to obtain the modulated optical signal; an analog to digital converter operationally coupled to the electrical input port, for digitizing the electrical signal to provide input digital signals; and a digital filter operationally coupled to the analog to digital converter, for receiving and digital filtering the input digital signals to provide N output digital signals, each of which for driving one of the N optical modulator segments.

BRIEF DESCRIPTION OF THE DRAWINGS

Exemplary embodiments will now be described in conjunction with the drawings, in which.

DETAILED DESCRIPTION

Figure 3:
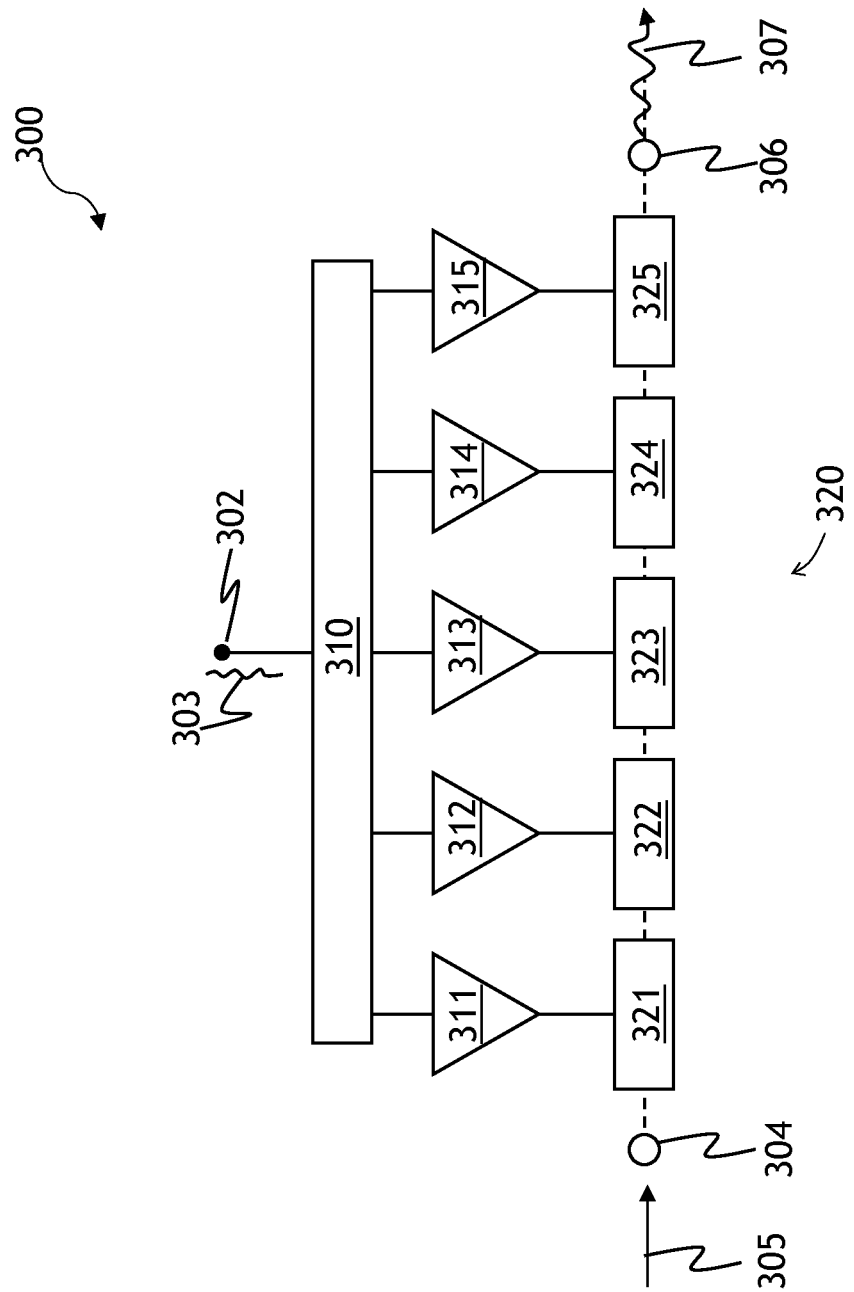
FIG. 3 is a schematic diagram of a modulator apparatus of the present disclosure.
Figure 5:
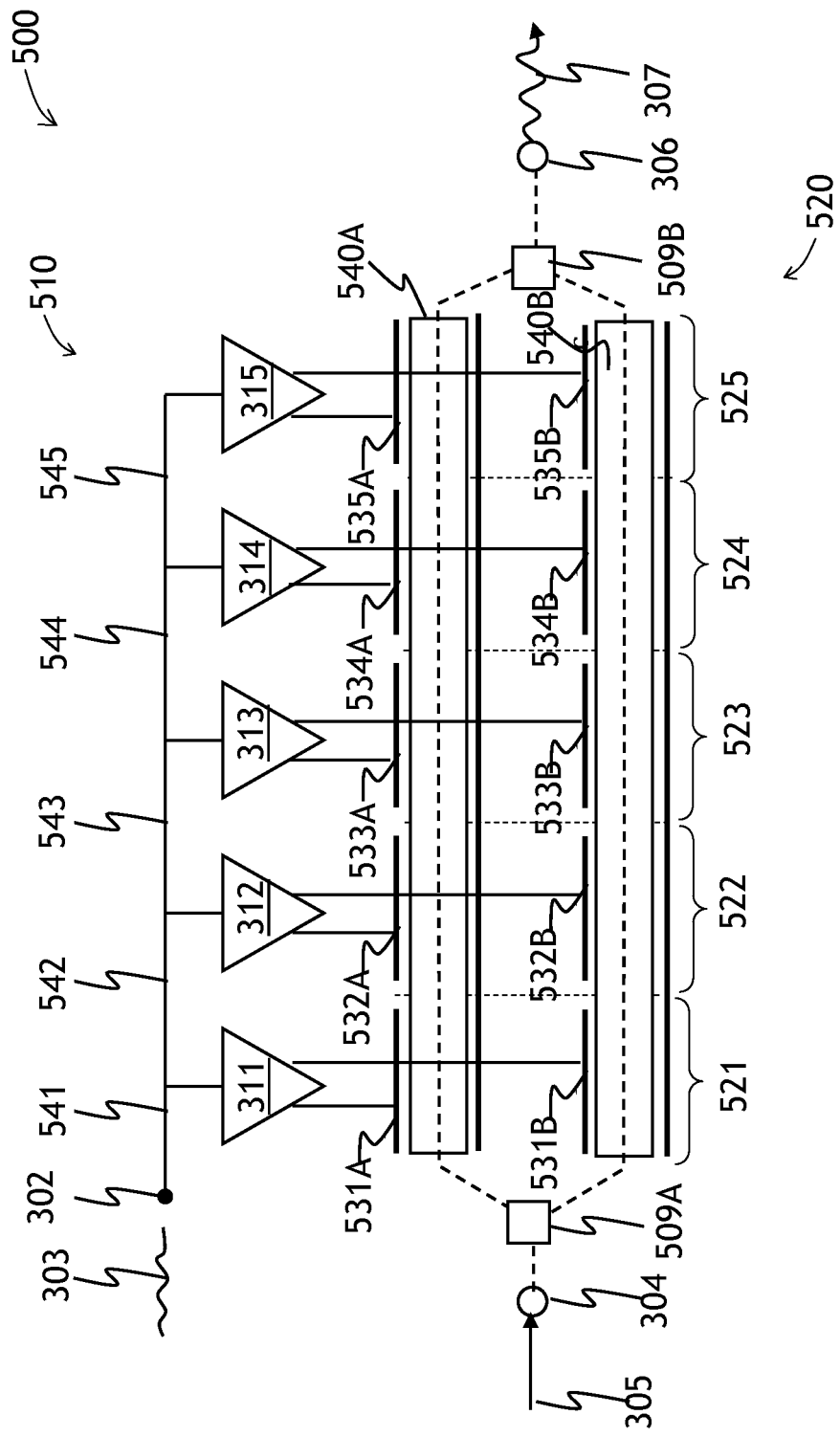
FIG. 5 is a schematic diagram of an embodiment of a modulator apparatus of the present disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. In FIGS. 3 and 5, similar reference numerals denote similar elements, as well as in FIGS. 6A, B; 7A, B; 8A, B; 11A, B; 12A, B; and FIGS. 13A, B.

Referring to FIG. 3, a modulator apparatus 300 of the present disclosure includes an optical path having an optical input port 304 for receiving an optical carrier wave 305, an optical output port 306 for outputting a modulated optical signal 307, and a succession 320 of serially optically coupled optical modulator segments 321, 322, 323, 324, and 325 extending between the input 304 and output 306 optical ports for modulating the optical carrier wave 305, so as to obtain the modulated optical signal 307 at the optical output port 306.

Figure 4:
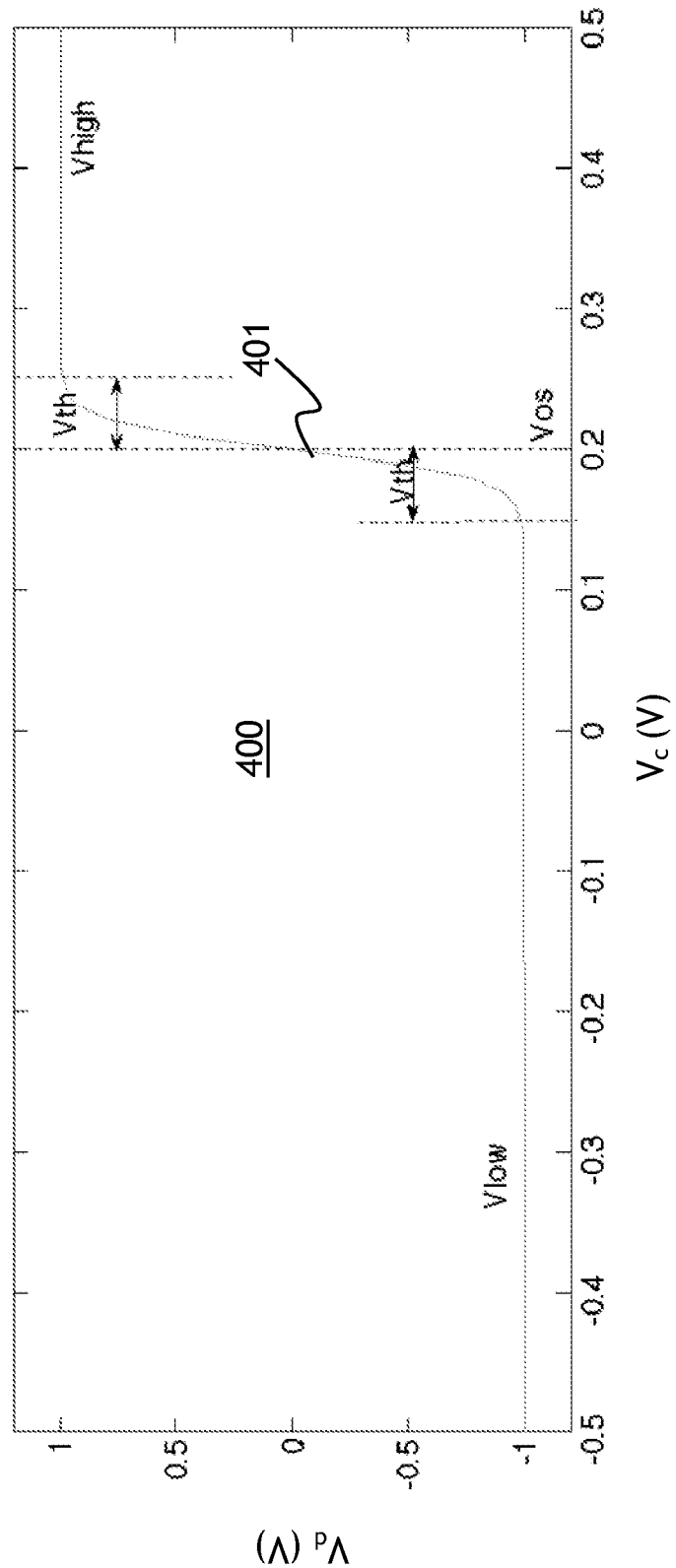
FIG. 4 is a transfer characteristic of a limiting amplifier of the modulator apparatus of FIG. 3.

A plurality of limiting amplifiers 311, 312, 313, 314, and 315 may be provided for driving the optical modulator segments 321-325. Each limiting amplifier 311-315 is electrically coupled to a particular one of the succession of the modulator segments 321-325 for applying a driving voltage $V_d$ thereto in response to a control voltage $V_c$. Referring to FIG. 4, a response characteristic 400 of the limiting amplifiers 311-315 may be defined by a low voltage $V_{low}$, a high voltage $V_{high}$, an offset voltage $V_{os}$, and a threshold voltage $V_{th}$. When $V_c < V_{os} - V_{th}$, $V_d = V_{low}$; when $V_c > V_{os} + V_{th}$, $V_d = V_{high}$; and when $V_c$ varies between $V_{os} - V_{th}$ and $V_{os} + V_{th}$, $V_d$ varies between $V_{low}$ and $V_{high}$; that is, when $V_c$ increases between $V_{os} - V_{th}$ and $V_{os} + V_{th}$, $V_d$ increases between $V_{low}$ and $V_{high}$, and vice versa. The parameters $V_{low}$, $V_{high}$, $V_{os}$, and $V_{th}$ of different limiting amplifiers 311-315 may differ from amplifier to amplifier.

The threshold voltage parameter $V_{th}$ determines how abrupt the transition is from "low" to "high", whereas the offset voltage parameter $V_{os}$ determines at which control voltage $V_c$ a midpoint 401 of the transition occurs. A "transition slope", defined as $(V_{high} - V_{low})/(2V_{th})$, may describe the abruptness of the transition, termed herein as "switching." The transition slope is defined herein as the slope of a line drawn between the high and low limits of a piecewise linear representation of the transition. In the non-limiting exemplary response characteristic 400 of FIG. 4, the high level $V_{high}$ is 1V, and the low level $V_{low}$ is −1V. The $V_{os}$ is 0.2V, and $V_{th}$ is approximately 0.05V. The transition slope in this example is 2V/2*0.05V=20.

Referring again to FIG. 3, the modulator apparatus 300 further includes an electrical input port 302 for receiving an electrical signal 303 to be modulated onto the optical carrier wave 305 to obtain the modulated optical signal 307. A plurality of electrical connections 310 are provided between the electrical input port 302 and each limiting amplifier 311-315. Each electrical connection is configured to provide a corresponding delay $\Delta T_{electrical}$ between the electrical input port 302 and each limiting amplifier 311-315. The limiting amplifiers 311-315 may introduce an additional delay $\Delta T_{amp}$, which may be the same, or may be different between different limiting amplifiers 311-315.

In operation, the propagating optical carrier wave 305 arrives at each successive optical modulator segment 321-325 with a delay $\Delta T_{optical}$. In one embodiment, the delays $\Delta T_{electrical}$ defined by the plurality of electrical connections 310 are selected so that the driving voltage $V_d$ is applied substantially at the speed of propagation of the optical carrier wave 305 the optical modulator segments 321-325. The delays $\Delta T_{electrical}$ may take into account possible different values of $\Delta T_{amp}$ of different limiting amplifiers 311-315. In other words, the delays $\Delta T_{electrical}$ may be selected so that in operation, the application of the driving voltage $V_d$ to individual optical modulator segments 321-325 in the succession 320 of the optical modulator segments 321-325 is substantially synchronized with propagation of the optical carrier wave 305 in the optical modulator segments 321-325.

One can add delays to either or both of $dT_{electrical}$ and $dT_{optical}$ so that the electrical signal and the optical signal propagate at the same rates, and the electrical signal 303 is faithfully amplified and modulated onto the optical carrier wave 305. In an embodiment where the $dT_{amp}$ of different limiting amplifiers 311-315 are different, the difference can be compensated by the correction applied to either or both of optical delays $dT_{optical}$ and/or electrical delays $dT_{electrical}$.

Furthermore, at least optical modulator segments 321-325 of the succession 320 may have different optical lengths.

Referring to FIG. 5, a modulator apparatus 500 is an embodiment of the modulator apparatus 300 of FIG. 3. In the modulator apparatus 500 of FIG. 5, a succession 520 of serially optically coupled optical modulator segments 521, 522, 523, 524, and 525 includes a 3 dB splitter 509A, first 540A and second 540B optical waveguides coupled to the 3 dB splitter 509A, a succession of electrodes 531A, 532A, 533A, 534A, and 535A disposed along the first optical waveguide 540A and operationally coupled to the optical waveguide 540A, a succession of electrodes 531B, 532B, 533B, 534B, and 535B disposed along the second optical waveguide 540B and operationally coupled to the optical waveguide 540B, and a 3 dB combiner 509B coupled to the first 540A and second 540B optical waveguides. The electrode pairs 531A-531B, 532A-532B, 533A-533B, 534A-534B, and 535A-535B may define respective modulator segments 521, 522, 523, 524, and 525. A plurality of electrical connections 510 of the modulator apparatus 500 may include a succession of serially electrically coupled electrical delay line segments 541, 542, 543, 544, and 545.

As seen in FIG. 5, each progressive one of the succession of electrical delay line segments 541-545 is electrically coupled to one of the limiting amplifiers 311-315, which is electrically coupled to a corresponding progressive one of the optical modulator segments 521-525. The delays $\Delta T_{electrical}$ are selected so that the application of the driving voltage $V_d$ to individual optical modulator segments 521-525 of the succession 520 is essentially synchronized with propagation of the optical carrier wave 305 in the optical modulator segments 521-525, causing the succession of electrodes 521-525 to approximate, in a piecewise fashion, an electromagnetic wave propagating in synchronism with the optical carrier wave 305. The overall transfer function of the modulator apparatus 500 of FIG. 5, as well as the modulator apparatus 300 of FIG. 3, may be defined by selecting the parameters $V_{low}$, $V_{high}$, $V_{os}$, and $V_{th}$ of individual limiting amplifiers 311-315, as will now be explained.

Figure 6A:
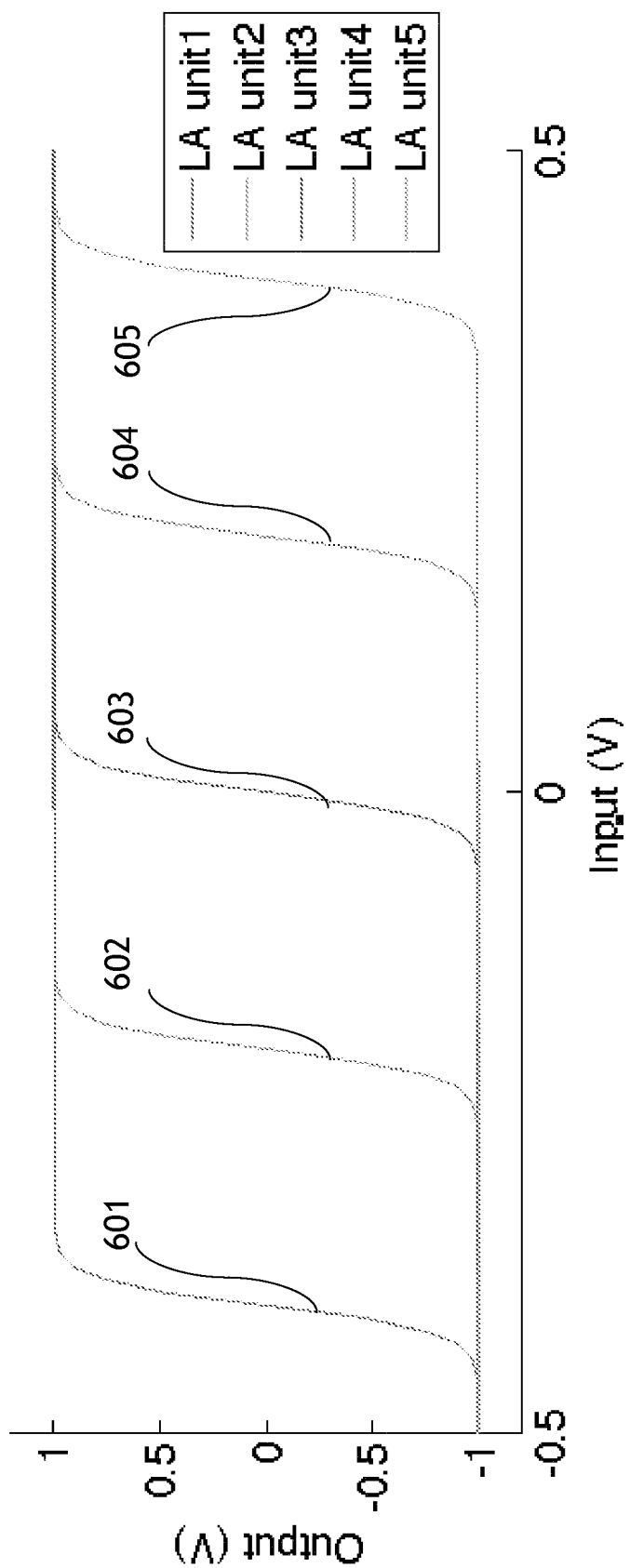
FIG. 6A is a graph of exemplary transfer functions of limiting amplifiers of the modulator apparatuses of FIG. 3 or 5, having a threshold voltage of 0.1V.

Referring to FIG. 6A, transfer functions 601, 602, 603, 604, 605 are non-limiting examples of transfer functions of the respective limiting amplifiers 311, 312, 313, 314, 315 of FIGS. 3 and 5. As can be gleaned from FIG. 6A, the offset voltage $V_{os}$ of each successive limiting amplifier 312-315 is greater than the offset voltage of the immediately preceding limiting amplifier 311-314, if any, by a same step voltage $\Delta V_{os}$. For the transfer functions 601, 602, 603, 604, 605 these $V_{os}$ values are approximately equal to 0.4V, −0.2V, 0V, +0.2V and +0.4V, respectively, with the step voltage $\Delta V_{os} = 0.2V$, while the threshold voltage $V_{th} = 0.1V$. In operation, the limiting amplifiers 311-315 turn on in sequence such that only one limiting amplifier 311-315 is operating in its transition region at a time. The other limiting amplifiers 311-315 either remain in an "off" state if they have a higher $V_{os}$ than the current control voltage $V_c$, or in a fully "on" state if they have a lower $V_{os}$ than the current control voltage $V_c$. The $V_{os}$ values may range over both negative and positive values. For other embodiments, in which the input range could be different, such as 0V to +1V, or from any convenient lower limit to any convenient upper limit of input voltages, the $V_{os}$ values of the successive limiting amplifiers may be selected to match the desired input voltage range.

Figure 1:
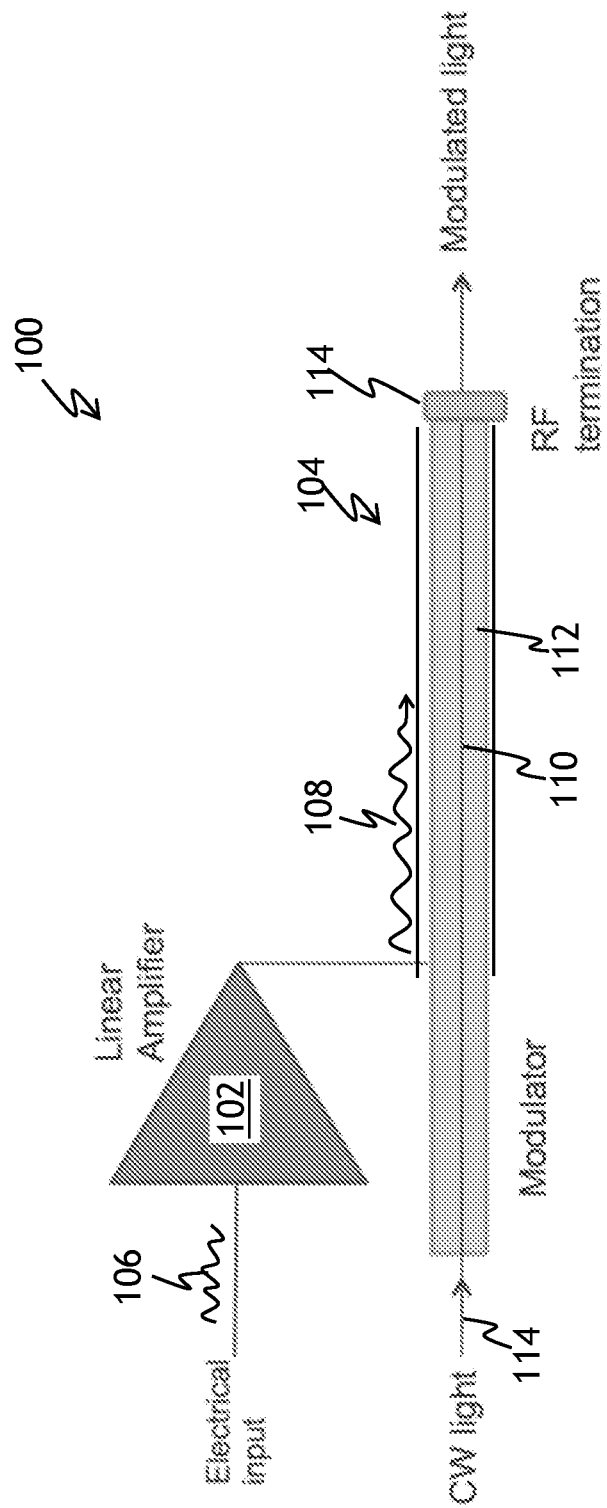
FIG. 1 is a schematic diagram of a prior-art optical modulator having a single linear amplifier.
Figure 2:
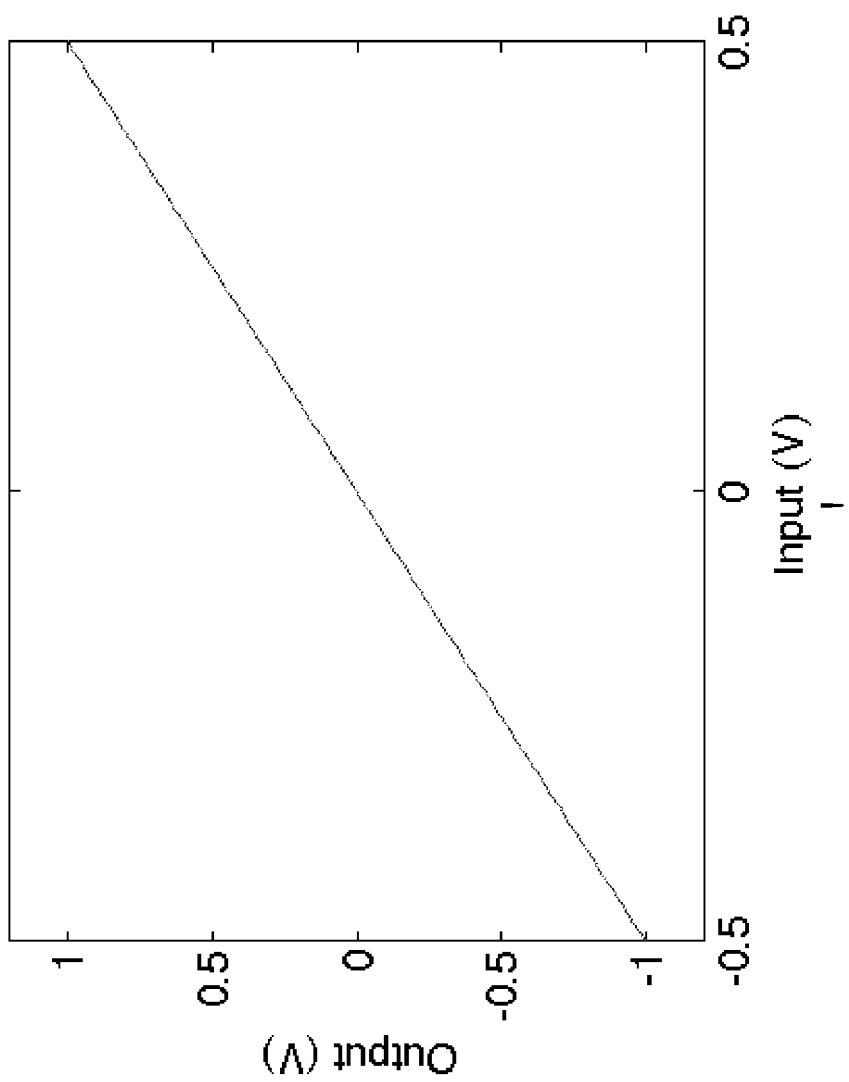
FIG. 2 is a transfer function of the linear amplifier shown in FIG. 1.
Figure 6B:
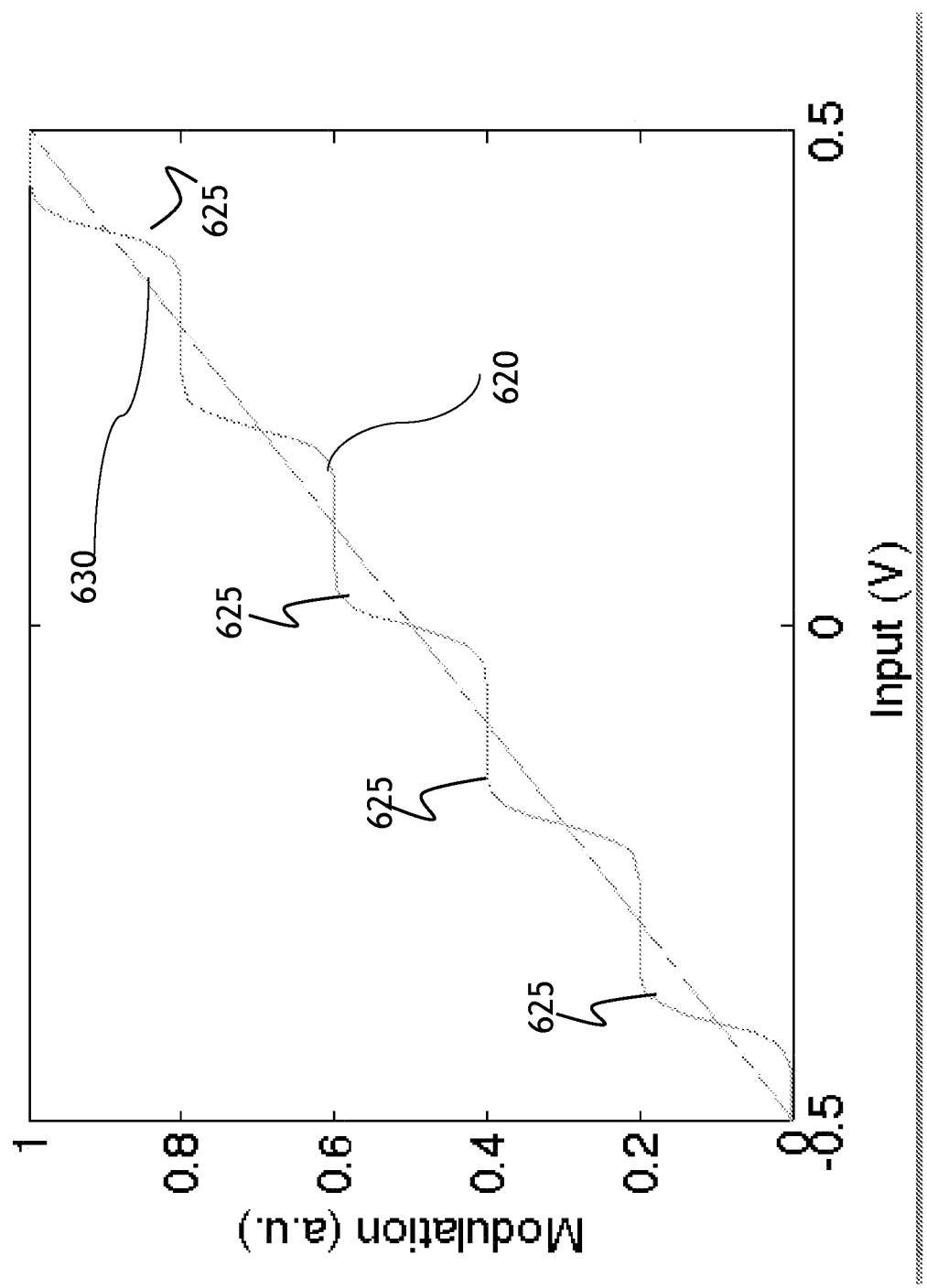
FIG. 6B is a graph of overall transfer function of a modulator apparatus of FIG. 3 or 5, having the limiting amplifiers with transfer functions shown in FIG. 6A.

Turning to FIG. 6B, an overall transfer function 620, i.e. optical modulation vs. control voltage $V_c$, of the modulator apparatus 500 of FIG. 5 is compared to a linear transfer function 630 of a conventional optical modulator, such as the optical modulator 100 of FIG. 1 having the linear amplifier driver 102. The transfer function 620 of the modulator apparatus 500 of FIG. 5 has a staircase shape centered around the linear transfer function 630. In the transfer function 620, kinks 625 are associated with the time intervals when the limiting amplifiers 311-315 turn on one by one as the control voltage $V_c$ increases.

While the optical modulator 300 of FIG. 3 or 500 of FIG. 5 may provide an output signal in an approximation to a linear output, it may be desirable to obtain a transfer function that more closely corresponds to the linear transfer function 630. Embodiments which may provide an improved linearity of an overall transfer function of the modulator apparatus 300 of FIG. 3 and 500 of FIG. 5 will now be described.

Figure 7A:
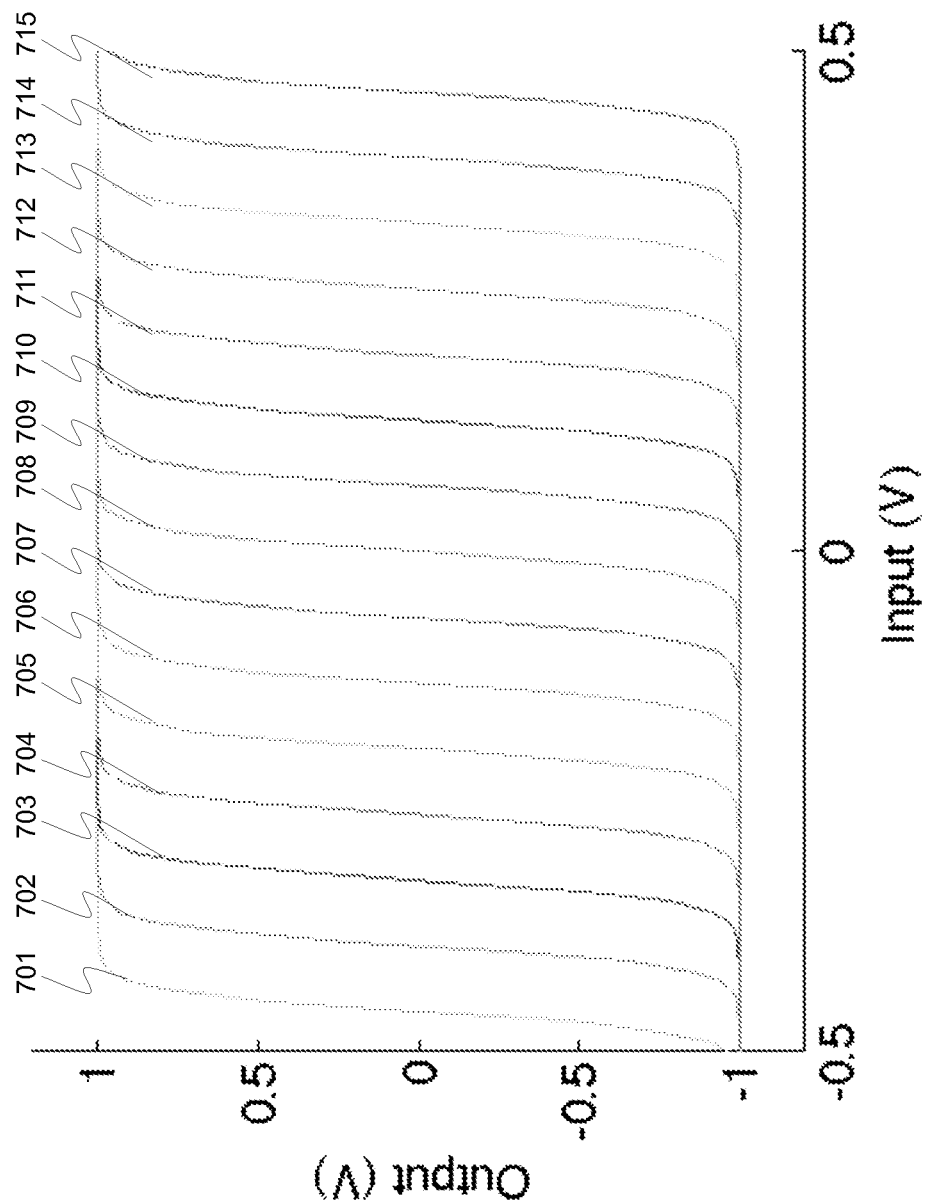
FIG. 7A is a graph of transfer functions of fifteen limiting amplifiers according to one embodiment of the present disclosure.
Figure 7B:
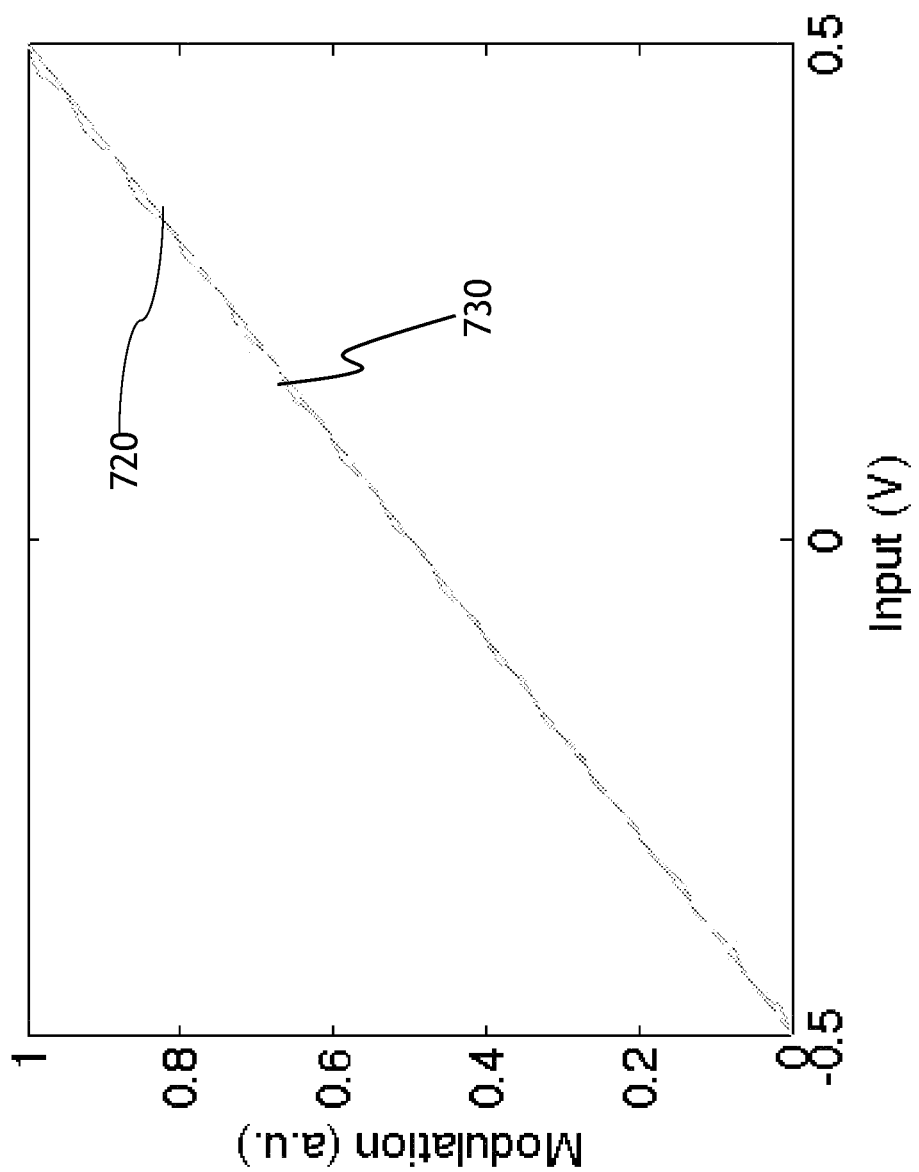
FIG. 7B is a graph of overall transfer function of a modulator apparatus having the fifteen limiting amplifiers with transfer functions shown in FIG. 7A.

In one such embodiment, the total number of the limiting amplifiers 311-315, and accordingly the total number of the optical modulator segments 321-325 per operational range of the control voltage $V_c$, is increased. For generality, the limiting amplifiers 311-315 and the optical modulator segments 321-325 or 521-525, etc. may denote an arbitrary number N of the corresponding elements, despite that only five reference numerals e.g. 311, 312, 313, 314, 315 are used. Referring to FIG. 7A, transfer functions 701, 702, . . . , 715 correspond to fifteen limiting amplifiers having $V_{th}$=0.0333V, so that 30×$V_{th}$=1V. The respective values of $V_{os}$ range from −0.471V to +0.471V, and the step voltage $\Delta V_{os}$=1/15V. Turning to FIG. 7B, an overall transfer function 720 corresponds to the fifteen transfer functions 701-715 of FIG. 7A. The overall transfer function 720 is much close to a linear transfer function 730. Therefore, increasing the total number of limiting amplifiers 311-315 from five to fifteen may result in a much more linear overall transfer function. In principle, one could generate a transfer function that deviates by less than a desired amount by increasing the number of limiting amplifiers sufficiently. As a guide, five or more limiting amplifiers 311-315 may be provided. More than eight limiting amplifiers 311-315 may be provided.

In another embodiment, the threshold voltage $V_{th}$ of each limiting amplifier 311-315 may be increased to make the transition from the low voltage $V_{low}$ to the high voltage $V_{high}$ less abrupt as the control voltage $V_c$ is increased over the voltage range in which a specific limiting amplifier 311-315 is in active transition between the low voltage $V_{low}$ and the high voltage $V_{high}$. In particular, the transition slope of the limiting amplifier 311-315 transfer characteristic may be reduced to smoothen the kinks 615 in FIG. 6B.

Figure 8A:
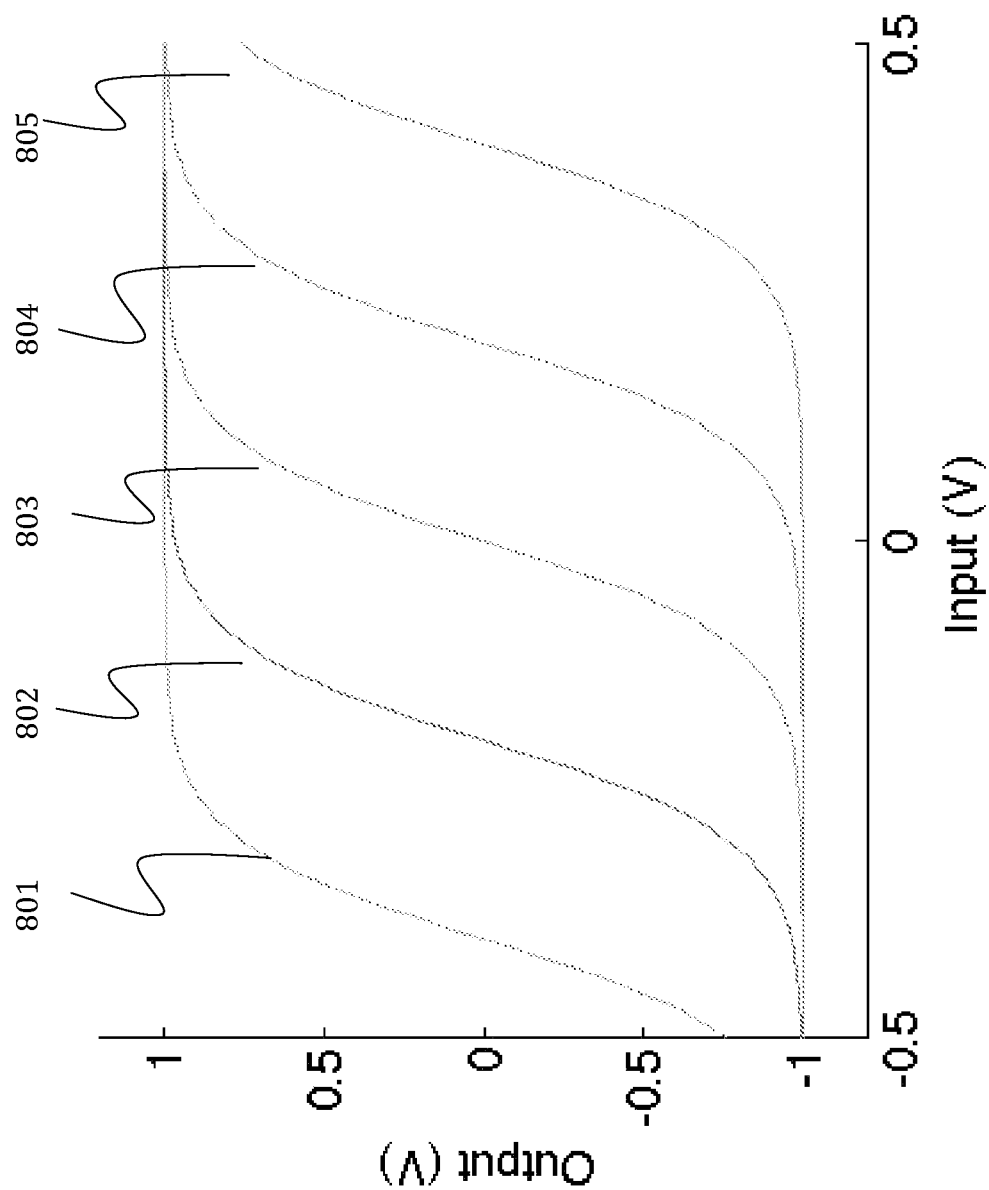
FIG. 8A is a graph of transfer functions of limiting amplifiers of the modulator apparatuses of FIG. 3 or 5 having a threshold voltage of 0.5V.
Figure 8B:
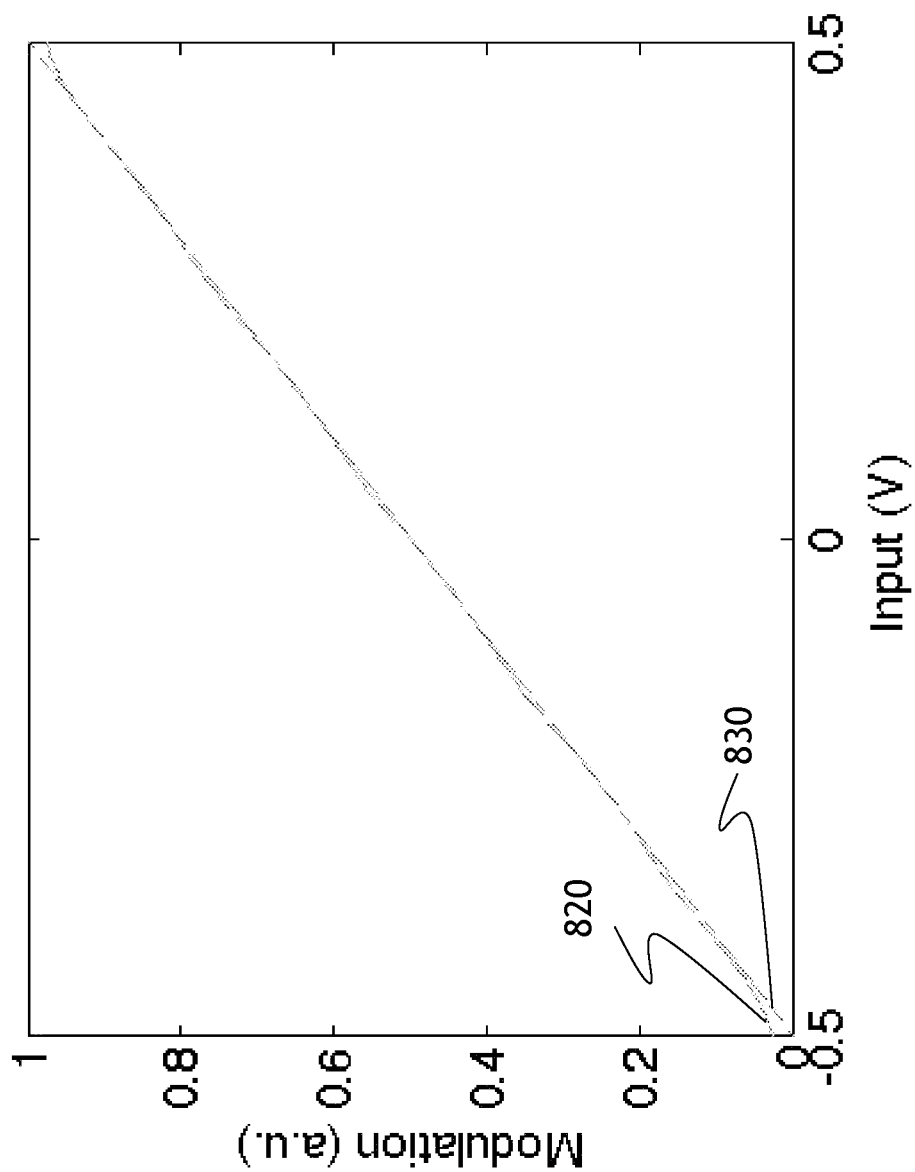
FIG. 8B is a graph of overall transfer function of a modulator apparatus having the limiting amplifiers with transfer functions shown in FIG. 8A.

Referring to FIG. 8A with further reference to FIG. 6A, transfer functions 801, 802, 803, 804, 805 have the threshold voltage $V_{th}$=0.50V, that is, five times larger than the transfer functions 601, 602, 603, 604, 605 of FIG. 6B. The respective values of $V_{os}$ of the transfer functions 801-805 range from −0.4V to +0.4V with the step voltage $\Delta V_{os}$=0.2V. Turning to FIG. 8B, an overall transfer function 820 is much closer to a linear transfer function 830. Therefore, the limiting amplifier 311-315 implementation with the threshold voltage $V_{th}$=0.50V (FIG. 8B) provides the transfer function 820, which is much closer to the linear transfer function 830 of the conventional linear amplifier 102 (FIG. 1) than the limiting amplifier 311-315 implementation with the threshold voltage $V_{th}$=0.1V (FIG. 6B). Thus, the transition slope in this example is 1V/2*0.1V=5. In principle, one might generate a transfer function that deviates by less than a desired amount by increasing the value of $V_{th}$ sufficiently. The transition slope may be selected to be less than 5, or even less than 2 in some cases.

The threshold voltage $V_{th}$, the offset voltages $V_{os}$, the slope of the limiting amplifiers 311-315, and/or the number of the limiting amplifiers 311-315 may be varied to obtain a desired overall response function. In the example above, the offset voltage $V_{os}$ of each successive limiting amplifier 312-315 is greater than the offset voltage $V_{os}$ of the immediately preceding limiting amplifier 311-314. More generally, at least one of the low voltage $V_{low}$, the high voltage $V_{high}$, and the threshold voltage $V_{th}$, of at least one limiting amplifier 311-315 may be substantially different from a corresponding one of the low voltage $V_{low}$, the high voltage $V_{high}$, and the threshold voltage $V_{th}$ of another limiting amplifier 311-315.

In one embodiment, the low voltage $V_{low}$, the high voltage $V_{high}$, and the offset voltage $V_{os}$ of each limiting amplifier 311-315 are selected such that $V_{low}$ of each successive limiting amplifier 312-315 is substantially equal to $V_{high}$ of the immediately preceding limiting amplifier 311-314. In this embodiment, the output of a $j^{th}$ limiting amplifier, where j runs from 1 to the number of limiting amplifiers N, reaches the upper limit $V_{high}(j)$ when the control voltage $V_c$ applied to the $j^{th}$ limiting amplifier is $V_{os}(j)+V_{th}(j)$. The output of the $(j+1)^{th}$ limiting amplifier remains at $V_{low}(j+1)$ until the control voltage $V_c$ applied to the $(j+1)^{th}$ limiting amplifier reaches $V_{os}(j+1)-V_{th}(j+1)$. By setting $V_{os}(j)+V_{th}(j)=V_{os}(j+1)-V_{th}(j+1)$, one may ensure a smooth transition in the driving voltage $V_d$ as the $j^{th}$ limiting amplifier saturates, and the $(j+1)^{th}$ amplifier begins to operate when the control voltage $V_c$ is increased.

In one embodiment, the offset voltages $V_{os}$ are selected so that the slope of a given limiting amplifier 311-315 is equal to a respective slope of a piecewise linear approximation of a segment of a curvilinear line that one wishes to approximate. The successive limiting amplifier 311-315 may have a slope that is equal to the piecewise linear approximation of the successive segment of the curvilinear line that one wishes to approximate. One can select the threshold voltage $V_{th}(j)$ for the $j^{th}$ limiting amplifier so that the desired slope is achieved. The threshold voltages $V_{th}$ of different limiting amplifiers may be the same, or may be different. One can select the offset voltages $V_{os}(j)$ such that the midpoint of the line segment approximating the slope is located at the control voltage $V_c$ corresponding to the midpoint of the respective segment of the curvilinear line that one wishes to approximate.

Implementations of Limiting Amplifiers Based on CMOS or BJT Differential Pairs

Figure 9:
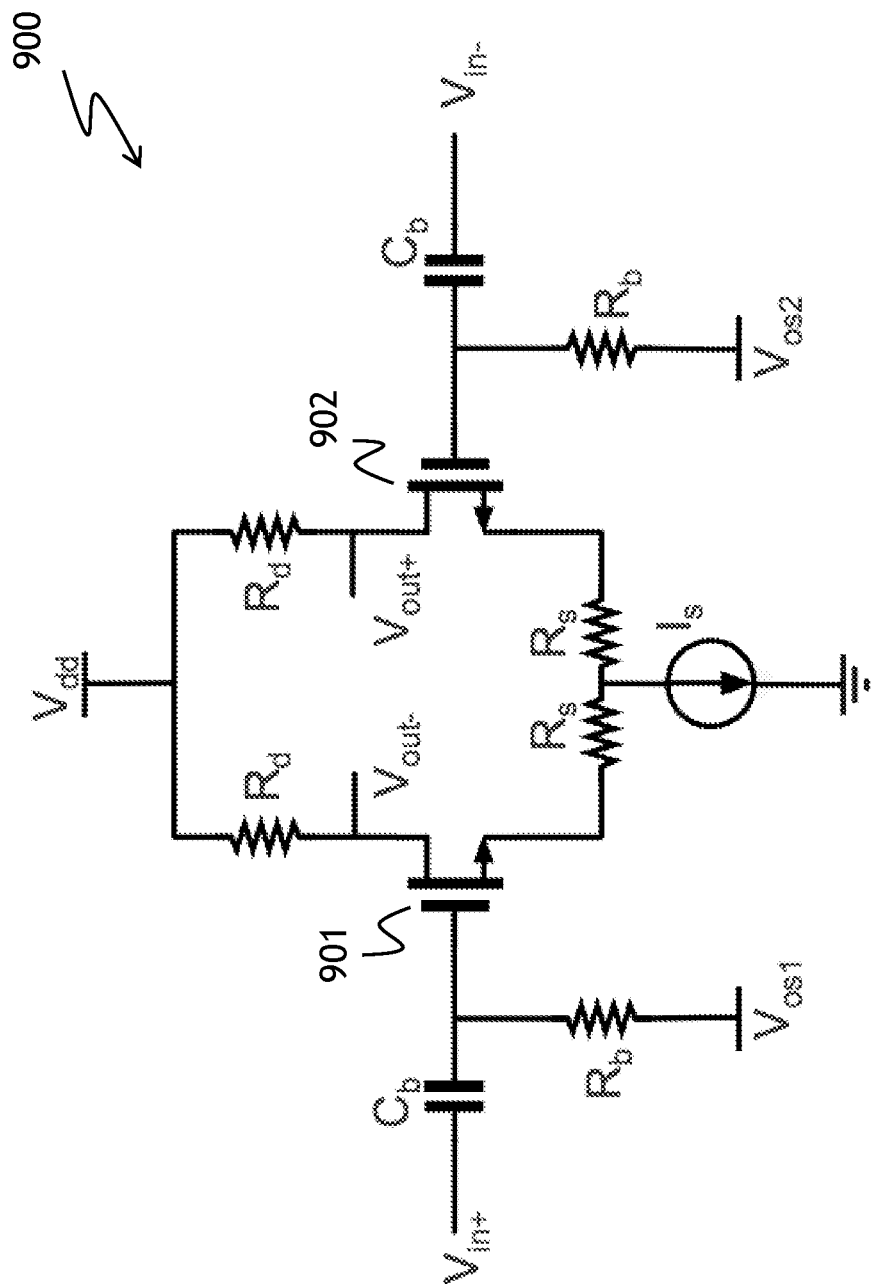
FIG. 9 is a circuit diagram of a limiting amplifier using a differential pair of MOSFET transistors.
Figure 10:
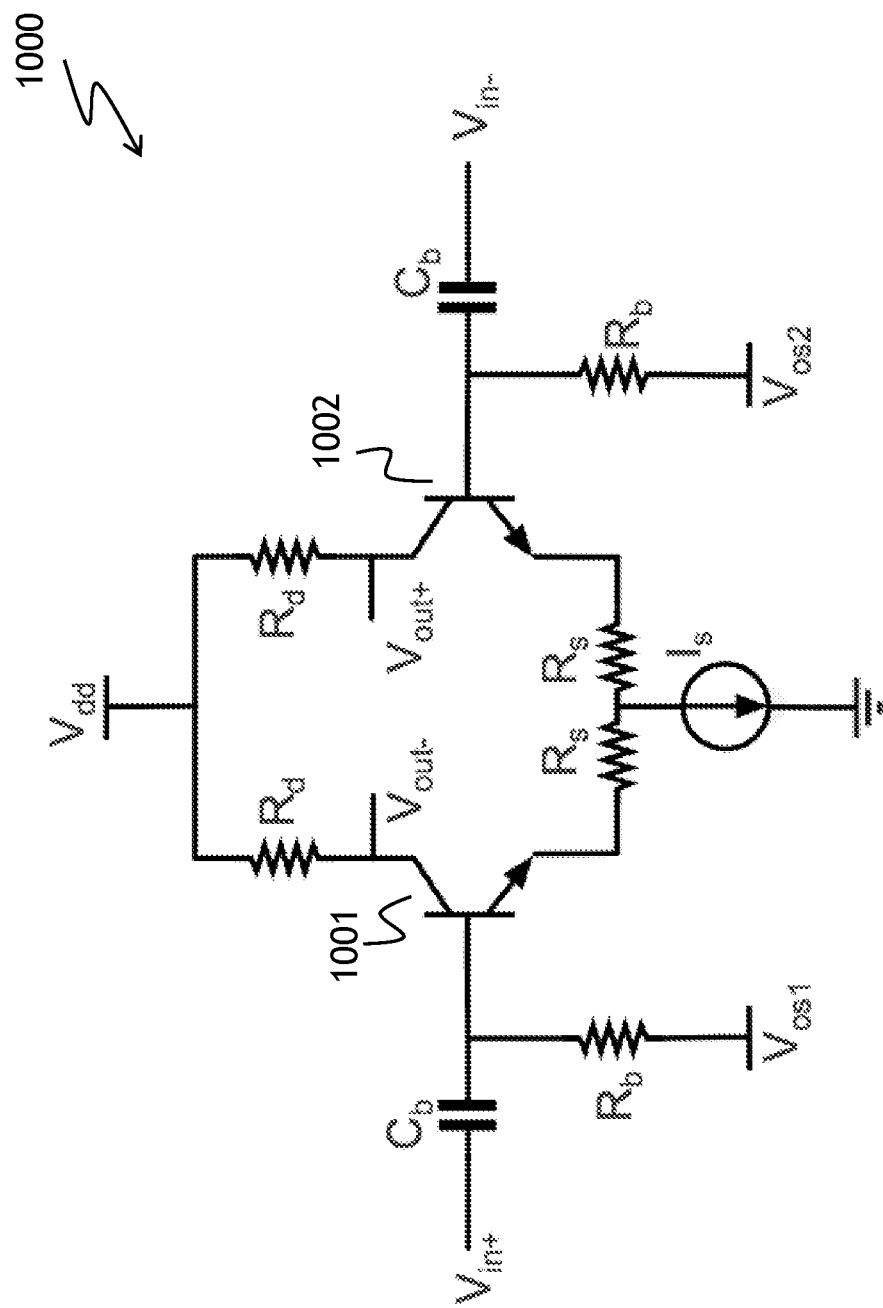
FIG. 10 is a circuit diagram of a limiting amplifier using a differential pair of bipolar transistors.

Referring to FIGS. 9 and 10, a schematic of a limiting amplifier 900 (FIG. 9) illustrates one implementation of the limiting amplifiers 311-315 (FIGS. 3 and 5) using a differential pair topology with MOSFET transistors 901 and 902. The limiting amplifier 900 is a symmetrical differential amplifier, with the MOSFET transistors 901, 902 electrically coupled to a common current source. In FIG. 10, a limiting amplifier 1000 illustrates a similar implementation of the limiting amplifiers 311-315 using a differential pair topology with bipolar transistors 1001, 1002. The limiting amplifiers 900 and 1000 have differential inputs with input voltage $V_{in}=V_{in+}-V_{in-}$ and differential outputs with output voltage $V_{out}=V_{out+}-V_{out-}$. Either one or both inputs and outputs may be used. Differential signaling uses both inputs and is usually preferred for better power efficiency. Single-ended signaling can also generate limiting transfer function at a half of the output magnitude.

Capacitor $C_b$ and resistor $R_b$ allow the input signal DC level to be removed. A new offset level may be provided via the ports $V_{os1}$ and $V_{os2}$. The offset $V_{os}$ is the difference between the two, $V_{os}=V_{os1}-V_{os2}$. Alternatively, in devices manufactured using SOI-based CMOS processes, one may change the substrate bias to change the threshold of the MOS transistors connected to $V_{in+}$ and $V_{in-}$, and the difference in the substrate bias of the two transistors is the $V_{os}$. Furthermore, in other embodiments one can have dedicated active level shifting circuitry preceding the differential pair circuit to add offset voltage to the incoming signal.

Still referring to FIGS. 9 and 10, $V_{high}$ and $V_{low}$ may be adjusted by changing the values of a current source $I_S$, a resistor $R_d$, and a supply voltage $V_{dd}$. The relationships among $V_{high}$, $V_{low}$, $I_S$ and $V_{dd}$ are given by:

$$V_{high}=V_{dd}$$

$$V_{low}=V_{dd}-I_S R_d$$

$V_{th}$ and slope may be adjusted by selecting the value of resistor $R_s$, which controls so-called "source degeneration." When resistors $R_d$ and $R_s$ are omitted, that is, have zero resistance, one can achieve the sharpest slope. As $R_d$ and $R_s$ become larger the slope observed in the output voltage becomes more gradual. The polarity of the slope may also be changed. The slope of the transfer function may be positive, as the transfer function 400 of FIG. 4, or negative. The polarity may be controlled by the polarity of the input or output signal, i.e. switching between $V_{in+}$ and $V_{in-}$ or alternatively $V_{out+}$ and $V_{out-}$. For a single-ended operation, one can use inverters as described above.

The limiting amplifiers 900 and/or 1000 of FIGS. 9 and 10 may have different parameters $V_{high}$, $V_{low}$, $V_{os}$, $I_S$, and $V_{dd}$. Furthermore, the limiting amplifiers 900 and/or 1000 may be configured to have programmable $V_{os}$, $V_{th}$, $V_{low}$, and $V_{high}$. Non-linear transfer function systems, such a quadratic, cubic and higher order transfer function, sinusoidal transfer functions, and exponential transfer functions, may be realized. The optical modulator segment 321-325 and 521-525 lengths may also be different. Even if the limiting amplifiers 311-315 have the same $V_{high}$ and $V_{low}$, their contributions to the overall accumulated modulation could be weighted differently by the optical modulator segment 321-325 and 521-525 lengths. Given a sufficient number of limiting amplifiers 311-315 and the optical modulator segment 321-325 and 521-525 segments, the output modulation may be flexibly configured or programmed. This may provide a useful signal processing functionality, while still maintaining power efficiency.

Using a sequence of the limiting amplifiers 311-315, implemented with the MOSFET 901, 902 and/or bipolar 1001, 1002 transistors as shown in FIGS. 9 and 10, respectively, or in other suitable configurations, may substantially reduce electrical power consumption in comparison with a single high-overhead linear drive amplifier, such as the amplifier 102 of FIG. 1. The low power overhead is a result of each limiting amplifier 311-315 only driving a small segment of the succession 320 (FIG. 3) or 520 (FIG. 5). The combination of small localized load, instead of a large distributed load in the prior-art modulator 100 of FIG. 1, may allow the use of efficient circuit blocks such as the limiting amplifiers 900 and/or 1000. Furthermore, limiting amplifiers 311-315 draw very small power when remaining in $V_{high}$ or $V_{low}$ states, and therefore may lessen overall power overhead when only one of the limiting amplifiers 311-315 undergoes a transition between $V_{low}$ and $V_{high}$ at any given time.

The modulator apparatuses 300 (FIG. 3) and 500 (FIG. 5) may be implemented using a variety of material systems. For example, the modulator apparatus 500 may include a silicon photonic chip comprising the first 540A and second 540B optical waveguides. Advantageously, the silicon photonic chip may have the limiting amplifiers 311-315 monolithically integrated on the chip. Alternatively, the limiting amplifiers 311-315 may be disposed on a separate substrate wirebonded to the substrate supporting the modulator segments 521-525 (FIG. 5). In one embodiment, the electrical connections between the limiting amplifiers 311-315 and the modulator segments 521-525 may include microball or microbump contacts, vias, copper columns, etc.

The limiting amplifiers 311-315 of the modulator apparatuses 300 (FIG. 3) and 500 (FIG. 5) may be viewed as particular implementations of "segment drivers," whose function is to drive individual modulator segments 321-325 (FIG. 3) or 521-525 (FIG. 5). Although the limiting amplifiers 311-315 advantageously combine a voltage discriminating function and a amplifying function in a single circuit, thus saving circuit board space and electrical power, more generic segment drivers may replace all the limiting amplifiers 311-315 in each modulator embodiment disclosed above, for each particular implementation discussed above. According to the present disclosure, these generic segment drivers replacing the limiting amplifiers 311-315 may be amplifying or non-amplifying, and may be externally controlled. Each such segment driver may have a set of associated parameters, which include the low voltage $V_{low}$, the high voltage $V_{high}$, the unique offset voltage $V_{os}$, and the threshold voltage $V_{th}$.

For embodiments of the modulator apparatuses 300 and 500 including externally controlled segment drivers, a dedicated comparator module may be provided to turn on individual segment drivers when the control voltage $V_c$ exceed thresholds set or programmed for these individual segment drivers. In such embodiment, the comparator module may be operationally coupled to the electrical input port 302 and the plurality of segment drivers, for providing individual control signals to the plurality of segment drivers when the control voltage $V_c$ exceeds the offset voltages $V_{os}$ of corresponding segment drivers of the plurality of segment drivers. The corresponding control signals are sent to the segment drivers by the comparator module. The comparator module may include an ADC, a digital filter, etc.

Following examples illustrate some of many possibilities of generating arbitrary transfer function curves. One may generate transfer functions including power functions, such as $x^2$, $x^3$, and so forth. In the following examples, the optical modulator segments 321-325 and/or 521-525 lengths are taken to be identical, but the lengths may be different e.g. have a binary length relationship. The segment drivers driving the optical modulator segments 321-325 and/or 521-525 may have different $V_{os}$, $V_{th}$, $V_{low}$ and $V_{high}$ parameters. One might also achieve the same effect by having different modulator segment 321-325 and/or 521-525 lengths and keeping the output voltages $V_{low}$ and $V_{high}$ the same, which may be convenient or advantageous in actual circuit configuration at given supply voltage constraints.

Example 1

Figure 11A:
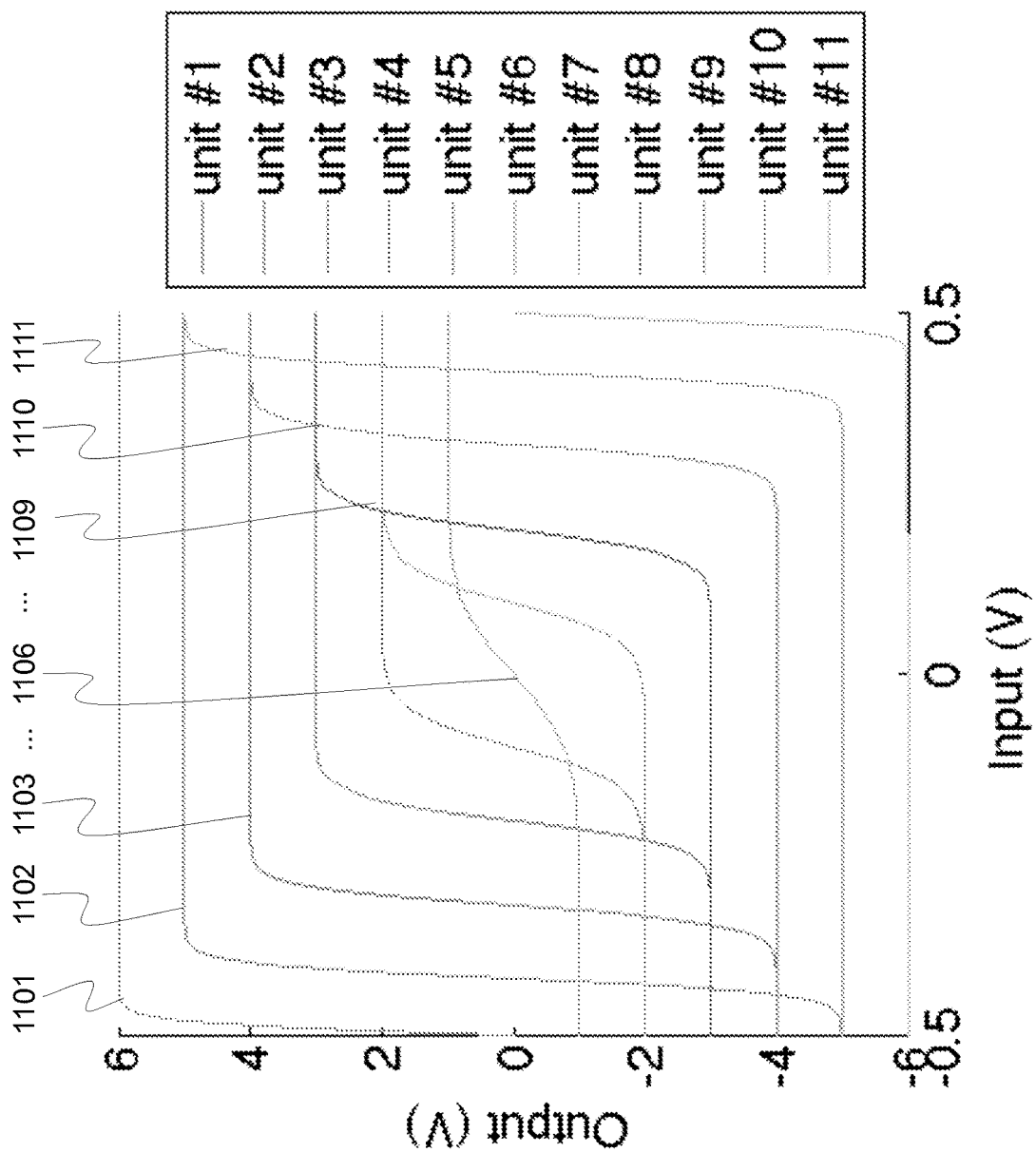
FIG. 11A is a graph of transfer functions of eleven segment drivers for approximating a third order overall transfer function.
Figure 11B:
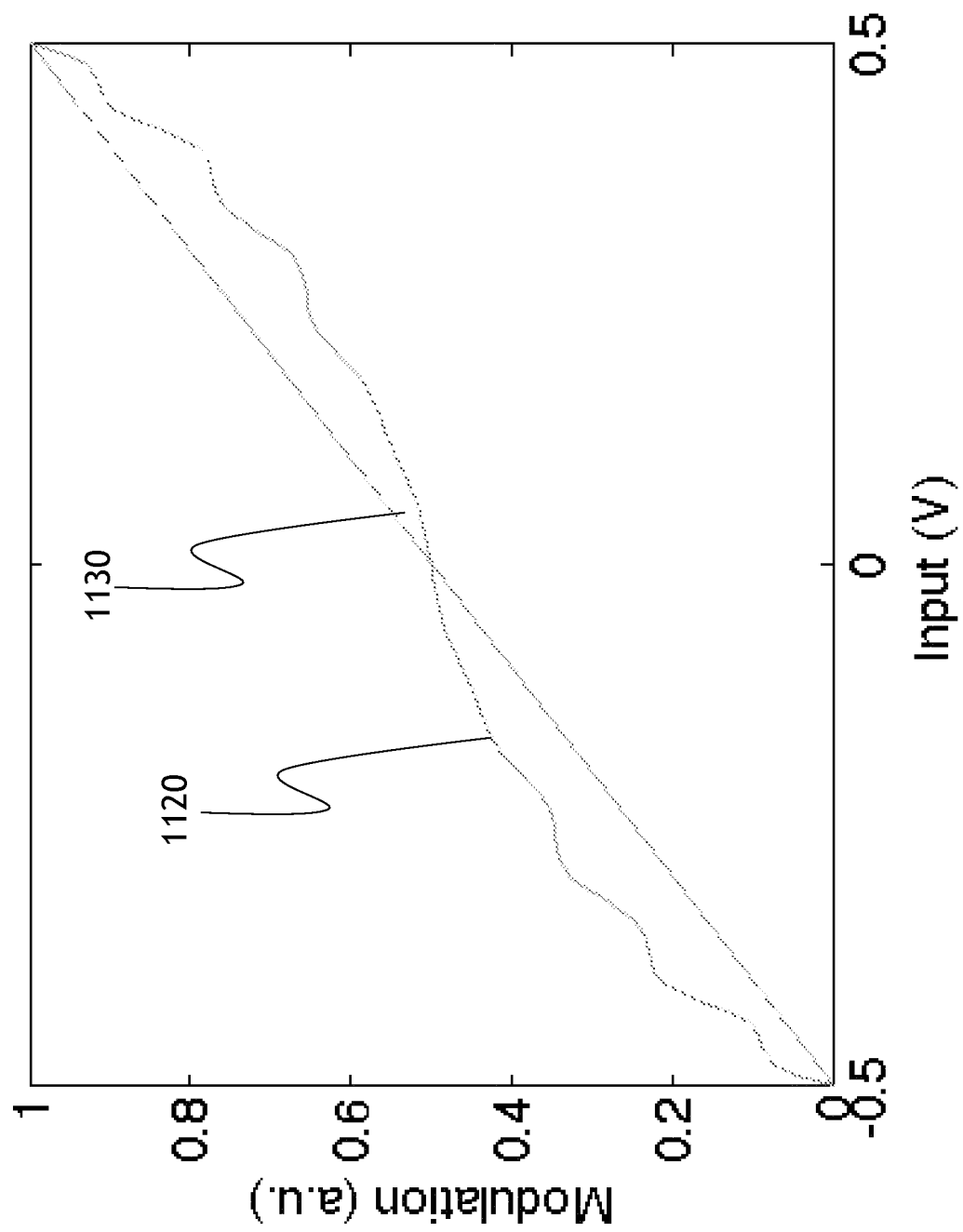
FIG. 11B is a graph of the third-order overall transfer function of the modulator apparatus having the eleven segment drivers with transfer functions of FIG. 11A.

This embodiment illustrates a super-linear third order ($x^3$) type overall transfer function of a modulator apparatus of the present disclosure, such as, for example, the modulator apparatus 300 of FIG. 3 or the modulator apparatus 500 of FIG. 5. Referring to FIG. 11A, graphs of transfer functions 1101, 1102, 1103, . . . , 1106, . . . , 1109, 1110 and 1111 approximating a third order overall response function, are provided for a modulator apparatus with N=11 segment drivers. Turning to FIG. 11B, an overall transfer function 1120 is compared with a transfer function 1130 of an optical modulator having a single linear amplifier.

Example 2

Figure 12A:
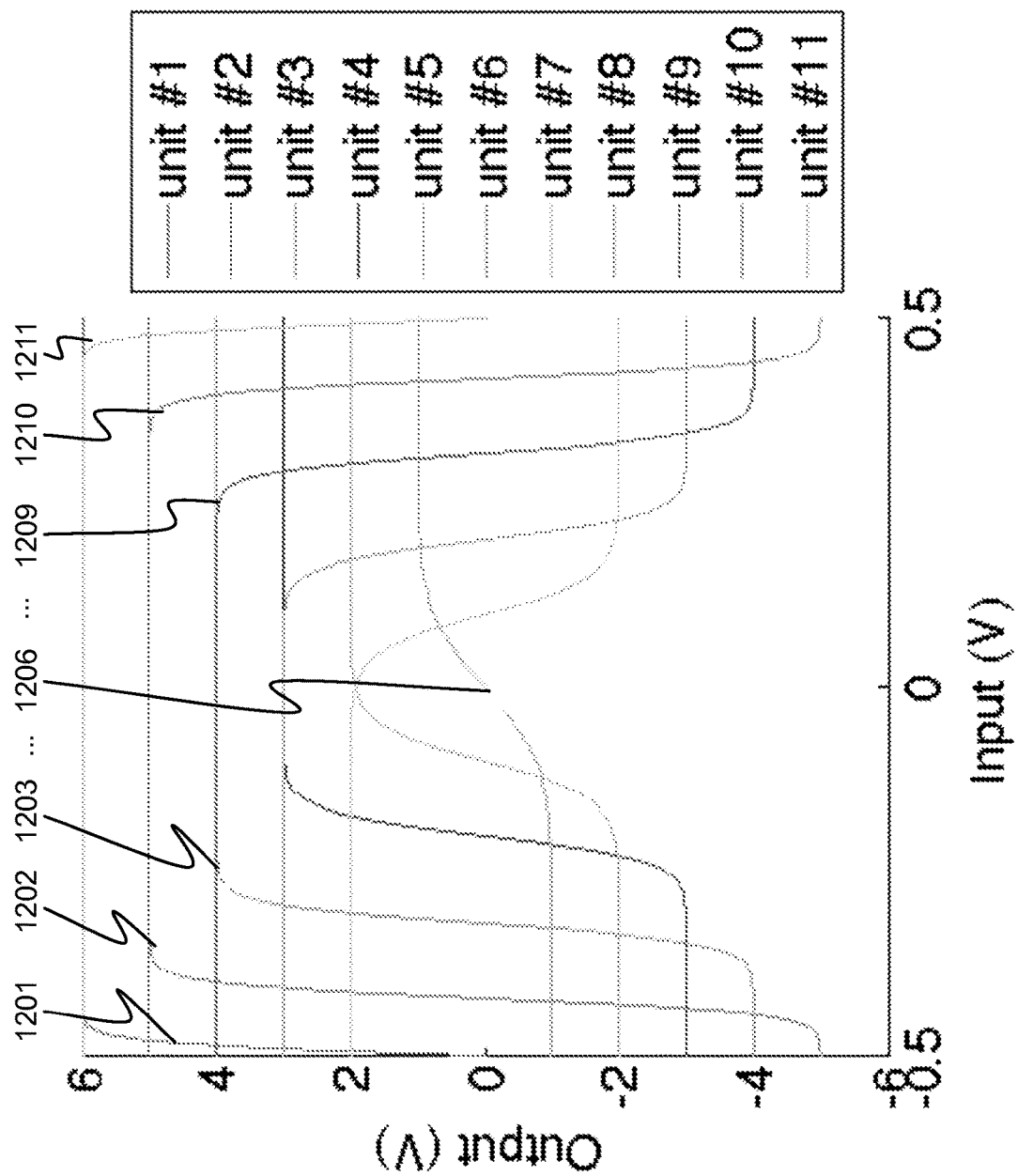
FIG. 12A is a graph of transfer functions of eleven segment drivers for approximating a second-order overall transfer function.
Figure 12B:
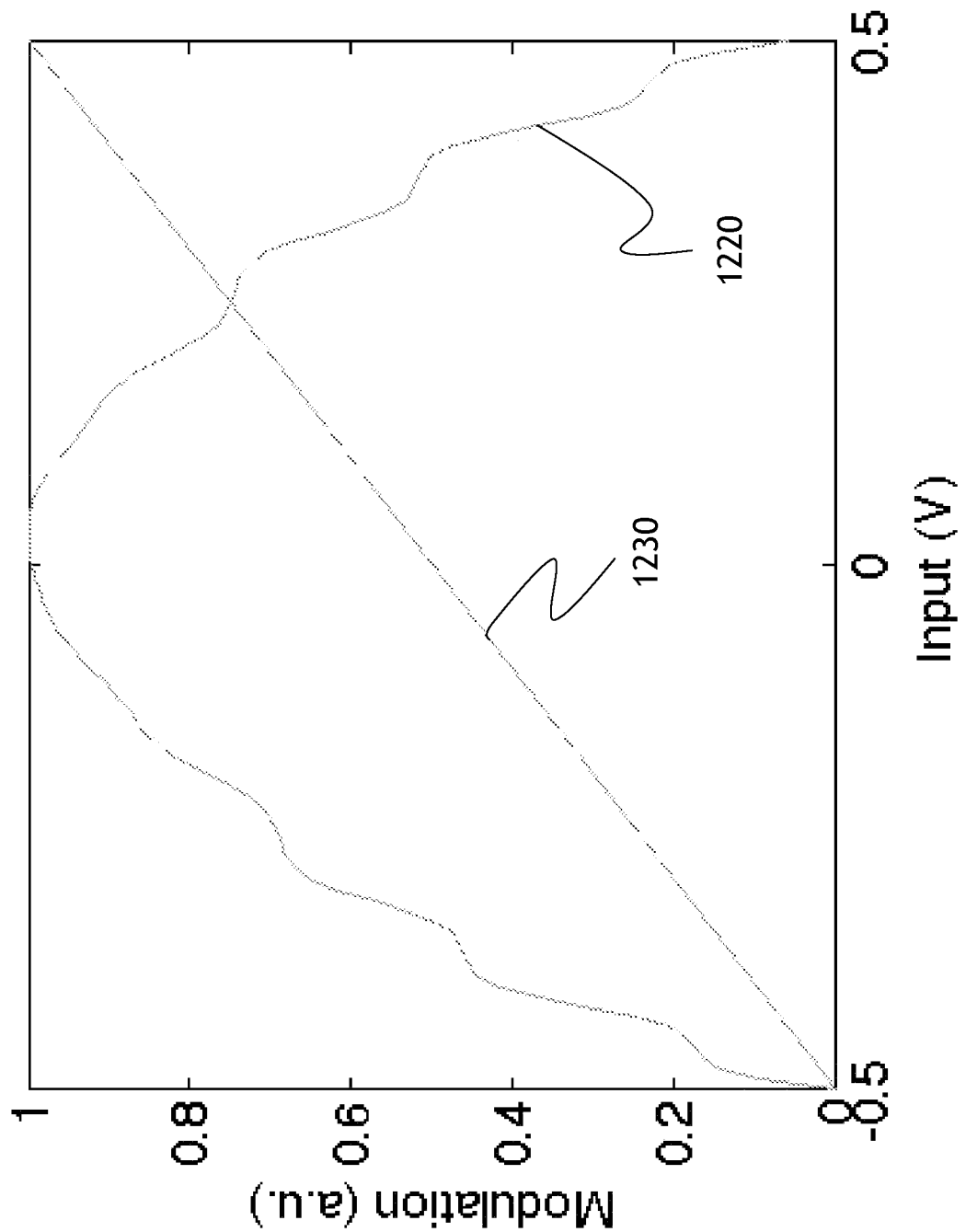
FIG. 12B is a graph of the second-order overall transfer function of the modulator apparatus having the eleven segment drivers with transfer functions of FIG. 12A.

This embodiment illustrates a second order (parabolic) overall transfer function of a modulator apparatus of the present disclosure. Referring to FIG. 12A, graphs of transfer functions 1201, 1202, 1203, . . . , 1206, . . . , 1209, 1210 and 1211 approximating a second order function are provided for a modulator apparatus with N=11 segment drivers. Transfer functions 1207-1211 have a negative slope. This can be achieved as explained above with reference to FIGS. 9 and 10. Turning to FIG. 12B, an overall transfer function 1220 is compared with a transfer function 1230 of an optical modulator having a single linear amplifier.

Example 3

Figure 13A:
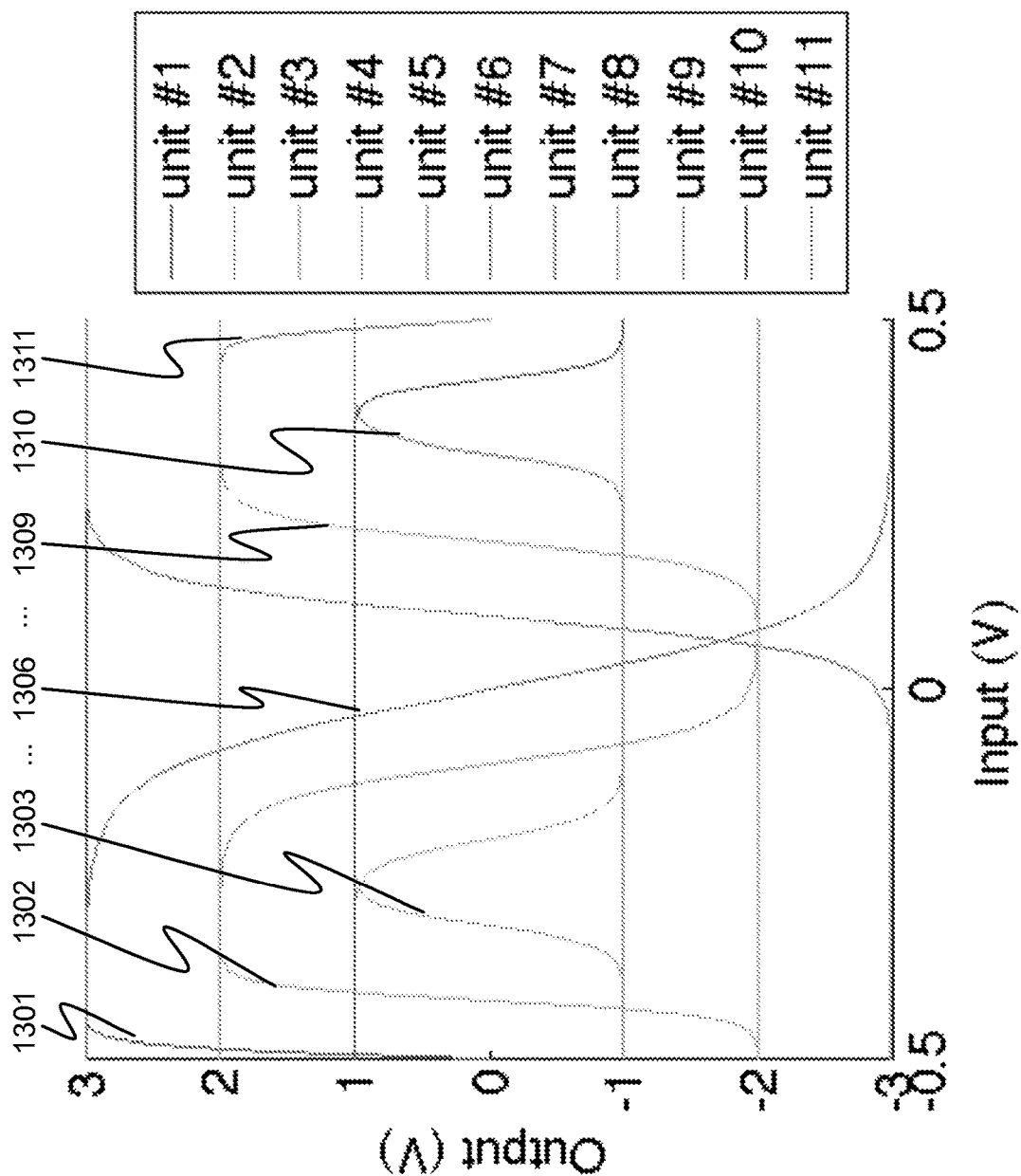
FIG. 13A is a graph of transfer functions of eleven segment drivers for approximating a periodic overall transfer function.
Figure 13B:
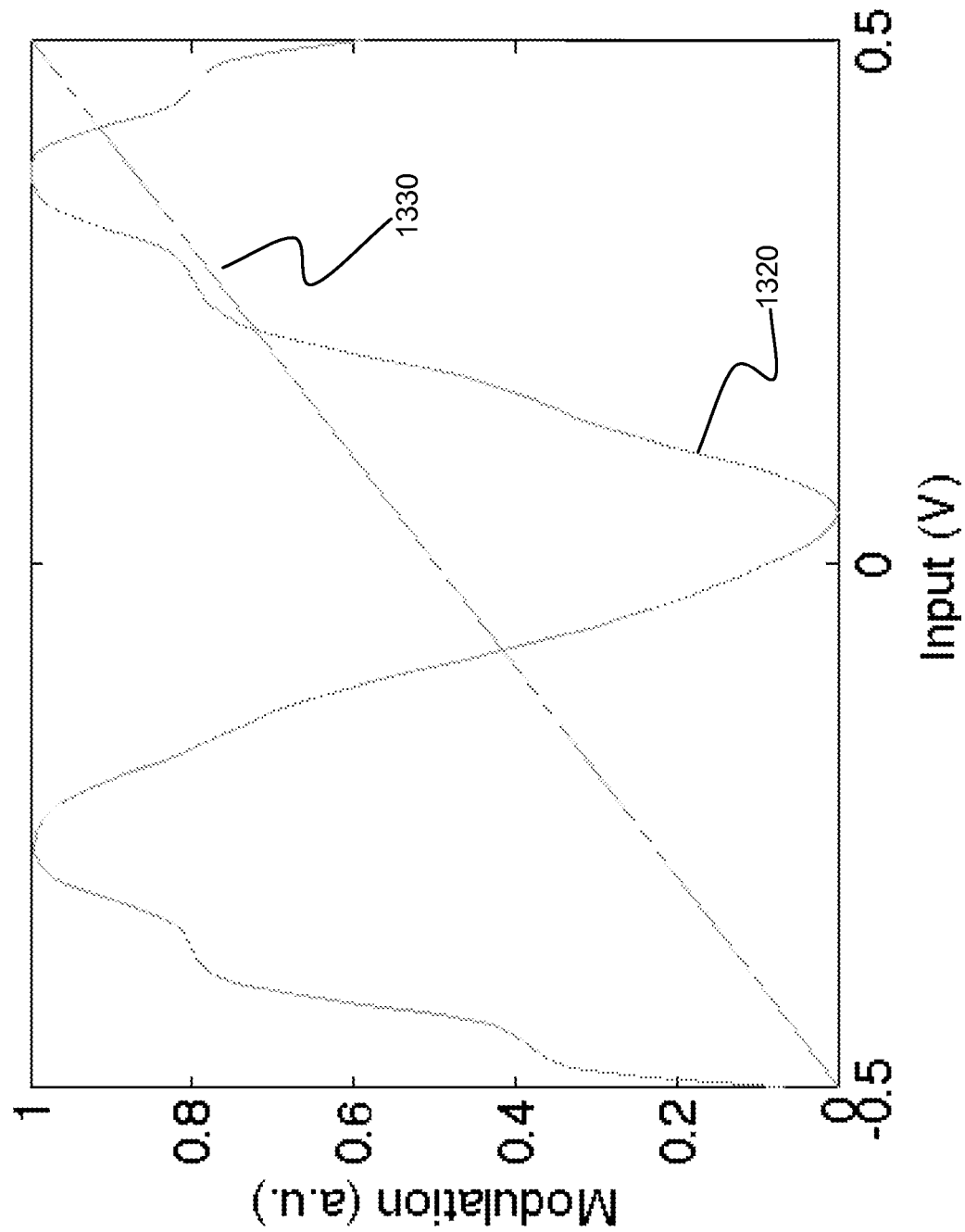
FIG. 13B is a graph of the periodic overall transfer function of the modulator apparatus having the eleven segment drivers with transfer functions of FIG. 13A.

This embodiment illustrates a sinusoidal overall transfer function of a modulator apparatus of the present disclosure. Referring to FIG. 13A, graphs of transfer functions 1301, 1302, 1303, . . . , 1306, . . . , 1309, 1310 and 1311 approximating a sinusoid are provided for a modulator apparatus with N=11 segment drivers. In this embodiment, some transfer functions have positive slopes, and some transfer functions have negative slopes. Turning to FIG. 13B, an overall transfer function 1320 is compared with a transfer function 1330 of an optical modulator having a single linear amplifier. The approximation of a sinusoidal function may be improved by using more segment drivers, and/or by fine-tuning the slopes and voltage levels of each segment driver as explained above.

Example 4

In this embodiment, a generalized exponential function $Y=A \exp(\alpha X+\beta)$ may be obtained. This function may be recorded as $Y=A [\exp(\alpha X)\exp(\beta)]$. Since $\exp(\beta)$ is a constant, the function may be reduced to $Y=B \exp(\alpha X)$, where $B=A \exp(\beta)$. For this embodiment, piecewise linear approximations to the curve $B \exp(\alpha X)$ may be taken between selected values of X. One may approximate each piecewise linear segment as a transfer function using one or more segment drivers as already described. One then "sums" all of the piecewise linear approximations to generate the desired approximation to the exponential curve over the range desired.

Figure 14:
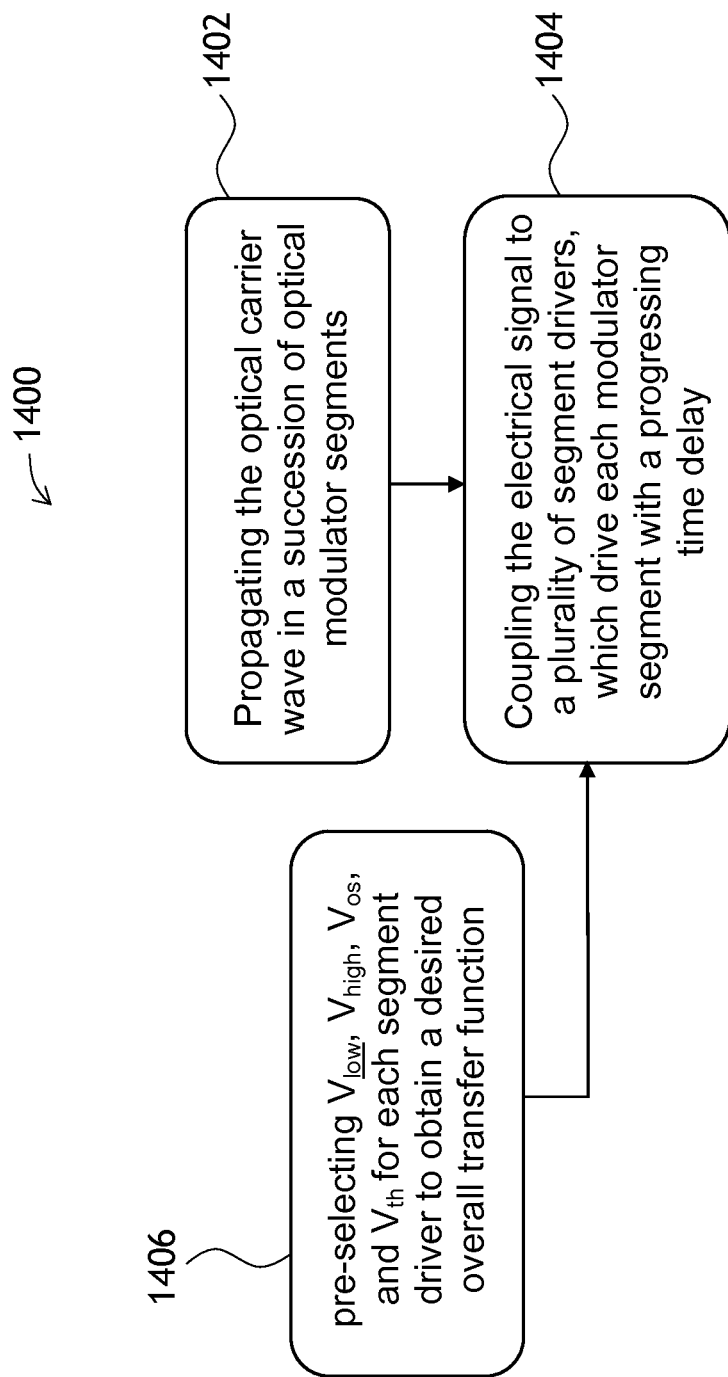
FIG. 14 is a flow chart of an exemplary method of modulating an optical carrier wave.

Referring to FIG. 14 with further reference to FIG. 3, a method 1400 (FIG. 14) of modulating the optical carrier wave 305 by the electrical signal 303 (FIG. 3) includes a step 1402 of propagating the optical carrier wave 305 in the succession 320 of serially optically coupled optical modulator segments 321-325. The electrical signal 303 may be coupled in a step 1404 to the plurality of the segment drivers, e.g. the limiting amplifiers 311-315. In the step 1404, each segment driver is electrically coupled to a particular one of the succession 320 of the modulator segments 321-325 for applying the driving voltage $V_d$ to the modulator segments 321-325 in response to a control voltage $V_c$, such that $V_d=V_{low}$ when $V_c<V_{os}-V_{th}$; $V_d=V_{high}$ when $V_c>V_{os}+V_{th}$; and $V_d$ varies between $V_{low}$ and $V_{high}$ when $V_c$ varies between $V_{os}-V_{th}$ and $V_{os}+V_{th}$. The electrical signal 303 may be coupled to the electrical input port 302, from which the electrical signal 303 propagates to each segment driver via the plurality of electrical connections 310 between the electrical input port 302 and each segment driver. Each electrical connection has a corresponding delay $\Delta T_{electrical}$ between the electrical input port 302 and each segment driver, such as the limiting amplifiers 311-315.

As explained above with reference to FIG. 5, the carrier optical wave 305 may be propagated in the optical waveguides 540A, B having the successions of electrodes 531A-535A and 531B-535B disposed along the respective optical waveguides 540A, B and operationally coupled to the optical waveguides 540A, B. The electrical signal 303 may be propagated in the succession 510 of serially electrically coupled electrical delay line segments 541-545. Each electrical delay line segment 541-545 may provide an electrical signal to one of the segment drivers, which is electrically coupled to corresponding progressive modulator segments 521-525 via the respective electrode pairs 531A, B-535A, B.

In one embodiment, the method 1400 may include a step 1406 of pre-selecting various parameters of the segment drivers. The parameters may also be programmed to provide a dynamically varying overall response function. By way of a non-limiting example, the offset voltage $V_{os}$ of each successive segment driver may be selected to be greater than the offset voltage $V_{os}$ of the immediately preceding segment driver. Furthermore, the low voltage $V_{low}$, the high voltage $V_{high}$, the offset voltage $V_{os}$, and the threshold voltage $V_{th}$, of each segment driver may be selected such that $V_{low}$ of each successive segment driver is substantially equal to $V_{high}$ of the immediately preceding segment driver. The slope $(V_{high}-V_{low})/2V_{th}$ of each segment driver may be selected so as to provide a degree of modulation of the optical carrier wave 305 substantially proportional to a magnitude of the electrical signal 303 received at the electrical input port 302. Alternatively, the low voltage $V_{low}$, the high voltage $V_{high}$, the offset voltage $V_{os}$, and the threshold voltage $V_{th}$, of each segment driver may be selected such that a degree of modulation of the modulated optical signal 307 is a desired function of the electrical signal 303 received at the electrical input port 302. As explained above with reference to 11A, B; 12A, B; and 13A, B, the function may include e.g. a quadratic, cubic, periodic, or an exponential function.

Figure 15:
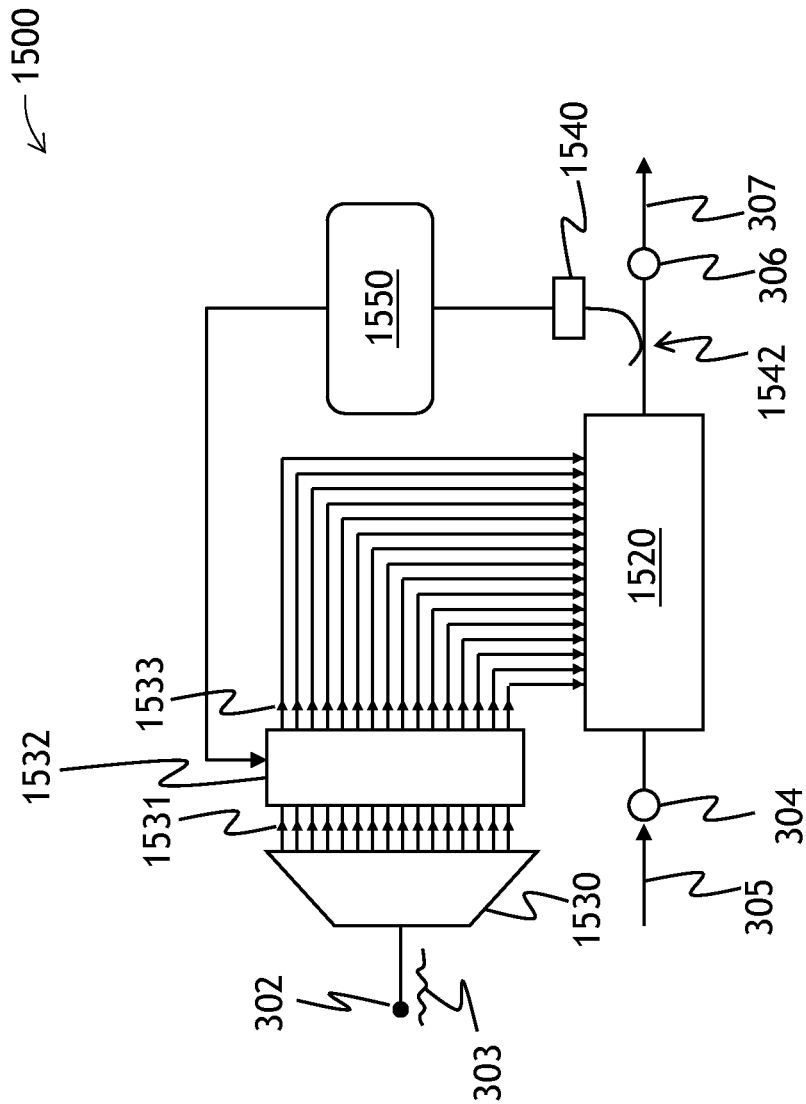
FIG. 15 is a schematic block diagram of an embodiment of an optical modulator including an analog to digital converter (ADC) and a digital filter coupled to the ADC.

Turning to FIG. 15, a modulator apparatus 1500 is a variant of the modulator apparatus 300 of FIG. 3. The modulator apparatus 1500 (FIG. 5) includes an optical path having the optical input port 304 for receiving the optical carrier wave 305, the optical output port 306 for outputting the modulated optical signal 307, and a succession 1520 of N serially optically coupled optical modulator segments, similar to the segments 321-325 of FIG. 3, extending between the input 304 (FIG. 15) and output 306 optical ports for modulating the optical carrier wave 305, so as to obtain the modulated optical signal 307 at the optical output port 306. The number of elements N may be, for example, at least 8 elements, or at least 16 elements.

The modulator apparatus 1500 further includes the electrical input port 302 for receiving the electrical signal 303 to be modulated onto the optical carrier wave 305 to obtain the modulated optical signal 307. An ADC 1530 is operationally coupled to the electrical input port 302. The function of the ADC 1530 is to digitize the electrical signal 303 to provide input digital signals 1531 representative of the electrical signal 303.

A digital filter 1532 may be operationally coupled to the ADC 1530. The function of the digital filter 1532 is to filter the input digital signals 1531 by a numerical computation to provide N output digital signals 1533, each of which being used for driving one of the N optical modulator segments. To provide the digital filtering function, the digital filter 1532 may include a field-programmable gate array (FPGA), a central processing unit (CPU), a microprocessor, etc. In one embodiment, the digital filter 1532 may be configured to provide an amplitude pre-emphasis, to lessen a non-linearity of modulation of the optical carrier wave 305 by the electrical signal 303. In another embodiment, the digital filter 1532 may be configured to provide a pre-determined frequency response or frequency pre-emphasis, to compensate for a frequency dependence of the modulation efficiency. More generally, the output digital signals 1533 may be a function of amplitude, frequency, and/or any other parameter of the input digital signals 1531. The digital filter 1532 may, therefore, provide a significant flexibility in obtaining a desired response function of the modulator apparatus 1500.

In one embodiment, a photodetector 1540 may be optically coupled to the optical output port 306 via an optional optical coupler 1542, for providing a feedback signal 1543 representative of the modulated optical signal 307. A controller 1550 may be operationally coupled to the photodetector 1540 and the digital filter 1530 for receiving the feedback signal 1543 from the photodetector 1540 and providing a control signal 1551 to the digital filter 1530 in dependence on the feedback signal 1543, for example to linearize the overall response function of the modulator apparatus 1500, for calibration purposes, etc.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A modulator apparatus comprising:
    a plurality of optical modulator segments configured to modulate a carrier wave propagating therethrough; and,
    a plurality of segment drivers coupled to the plurality of optical modulator segments for driving thereof responsive to an input electrical signal, the plurality of segment drivers configured to drive at least two of the optical modulator segments in accordance with differing limiting voltage transfer functions.

2. The modulator apparatus of claim 1 wherein the plurality of optical modulator segments are sequentially disposed in an optical path of the carrier wave.

3. The modulator apparatus of claim 2 wherein the plurality of optical modulator segments are monolithically integrated in or upon a substrate.

4. The modulator apparatus of claim 3 wherein the substrate comprises semiconductor material.

5. The modulator apparatus of claim 1 wherein different optical modulator segments from the plurality of optical modulator segments are coupled to different segment drivers from the plurality of segment drivers.

6. The modulator apparatus of claim 2 wherein the plurality of segment drivers are configured to drive the plurality of optical modulator segments synchronously with propagation of the optical carrier wave therein.

7. The modulator apparatus of claim 1 wherein the plurality of segment drivers comprises two segment drivers configured to drive two optical modulator segments with the differing limiting voltage transfer functions that relate two driving voltages applied to the two optical modulator segments to a control voltage Vc defined by the input electrical signal, and which limit the variation of the two drive voltages to different fractions of an operating range of the control voltage.

8. The modulator apparatus of claim 7 wherein the differing limiting voltage transfer functions comprise a first transfer function that limits the variation of a drive voltage applied to a first of the two optical modulator segments to a first fraction of the operating range of the control voltage, and a second transfer function that limit the variation of the drive voltage applied to a second of the two optical modulator segments to a second fraction of the operating range of the control voltage that is different from the first fraction.

9. The modulator apparatus of claim 5 wherein the plurality of segment drivers are configured to generate driving voltages for the optical modulator segments in dependence upon a control voltage provided to a corresponding segment driver in response to the input electrical signal, wherein each of the driving voltages transitions between a low voltage and a high voltage when the control voltage passes an offset voltage, and wherein at least one of the low voltage, the high voltage, or the offset voltage differs for at least two of the optical modulator segments.

10. The modulator apparatus of claim 9 wherein the driving voltages generated by at least some of the segment drivers are independent on the control voltage at the edges of the operating range thereof.

11. The modulator apparatus of claim 9 wherein the driving voltages generated by at least some of the segment drivers saturate away from the offset voltage as a function of the control voltage.

12. The modulator apparatus of claim 1 including an electrical input port and one or more electrical delay lines connecting the electrical input port to each segment driver so as to apply a driving voltage to the optical modulator segments synchronously with propagation of the carrier wave.

13. The modulator apparatus of claim 1, further comprising a comparator module operationally coupled to the plurality of segment drivers to provide individual control signals to each of the plurality of segment drivers in response to a control voltage $V_c$ when the control voltage $V_c$ exceeds a threshold set for the corresponding segment driver.

14. The modulator apparatus of claim 9, wherein the offset voltage of the segment driver of each successive optical modulator segment is greater than the offset voltage of the segment driver of an immediately preceding optical modulator segment.

15. The modulator apparatus of claim 1 comprising an optical waveguide traversing the plurality of optical modulator segments.

16. The modulator apparatus of claim 15 wherein the optical waveguide is implemented in a silicon photonic chip.

17. The modulator apparatus of claim 16 wherein the silicon photonic chip comprises the plurality of segment drivers.

* * * * *